United States Patent
Kondoh

(10) Patent No.: US 8,234,091 B2
(45) Date of Patent: Jul. 31, 2012

(54) ANGULAR VELOCITY SENSOR CORRECTING APPARATUS FOR DERIVING VALUE FOR CORRECTING OUTPUT SIGNAL FROM ANGULAR VELOCITY SENSOR, ANGULAR VELOCITY CALCULATING APPARATUS, ANGULAR VELOCITY SENSOR CORRECTING METHOD, AND ANGULAR VELOCITY CALCULATING METHOD

(75) Inventor: Takahiro Kondoh, Kanagawa-ken (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 374 days.

(21) Appl. No.: 12/606,061

(22) Filed: Oct. 26, 2009

(65) Prior Publication Data
US 2010/0106445 A1   Apr. 29, 2010

(30) Foreign Application Priority Data
Oct. 24, 2008   (JP) ................. 2008-274871

(51) Int. Cl.
*G01C 17/38* (2006.01)
*G01C 19/00* (2006.01)
*G01P 9/00* (2012.01)
*G01P 15/097* (2006.01)
*G01P 3/00* (2006.01)

(52) U.S. Cl. .......... 702/147; 702/94; 702/104; 702/145; 702/146; 702/151; 702/154; 73/504.12; 701/500

(58) Field of Classification Search ............... 73/504.12; 701/500; 702/94, 104, 151, 154
See application file for complete search history.

(56) References Cited

U.S. PATENT DOCUMENTS
6,757,631 B2 * 6/2004 Goto et al. ................. 702/104

FOREIGN PATENT DOCUMENTS
| | | |
|---|---|---|
| JP | 2-038916 A | 2/1990 |
| JP | 9-152338 A | 6/1997 |
| JP | 10-019585 A | 1/1998 |
| JP | 2001-330454 | 11/2001 |

* cited by examiner

*Primary Examiner* — Andrew Schechter
*Assistant Examiner* — L. Anderson
(74) *Attorney, Agent, or Firm* — Venable LLP; Michael A. Sartori; Christopher Ma

(57) ABSTRACT

A measuring unit obtains measurement data of an object measured on the basis of a signal from a GPS satellite and angular velocity of an object output from an angular velocity sensor. An offset value computing unit estimates a running condition of the object on the basis of the measurement data and the angular velocity. The offset value computing unit sequentially derives temporary offset values while changing combination of the measurement data and the angular velocity in accordance with the estimated running condition of the object and, after that, executes statistical process on the temporary offset values, thereby deriving an offset value. An angular velocity conversion coefficient computing unit sequentially derives temporary angular velocity conversion coefficients on the basis of the measurement data and the angular velocity and, after that, executes statistical process on the temporary angular velocity conversion coefficients, thereby deriving an angular velocity conversion coefficient. An angular velocity converting unit derives final angular velocity on the basis of the angular velocity conversion coefficient, the offset value, and the angular velocity.

6 Claims, 14 Drawing Sheets

| RUNNING CONDITION | FORGETTING FACTOR |
|---|---|
| STOP STATE | $\alpha 1$ |
| STRAIGHT RUNNING STATE | $\alpha 1$ |
| NON-STRAIGHT-RUNNING STATE | $\alpha 2 (\alpha 2 < \alpha 1)$ |

76

| CONDITION | FORGETTING FACTOR |
|---|---|
| X HOURS OR SHORTER | $\alpha 10$ |
| LONGER THAN X HOURS | $\alpha 11 (\alpha 11 < \alpha 10)$ |

| 330 PRESENT RELIABILITY | 332 CONDITIONS | 334 RELIABILITY AFTER CHANGE |
|---|---|---|
| ZEROTH RELIABILITY | DIFFERENCE VALUE ≤ THRESHOLD 1, 10 TIMES IN A ROW | FIRST RELIABILITY |
| FIRST RELIABILITY | DIFFERENCE VALUE ≤ THRESHOLD 2, 10 TIMES IN A ROW | SECOND RELIABILITY |
| | DIFFERENCE VALUE > THRESHOLD 1, 3 TIMES IN A ROW | ZEROTH RELIABILITY |
| SECOND RELIABILITY | DIFFERENCE VALUE ≤ THRESHOLD 3, 10 TIMES IN A ROW | THIRD RELIABILITY |
| | DIFFERENCE VALUE > THRESHOLD 2, 3 TIMES IN A ROW | FIRST RELIABILITY |
| THIRD RELIABILITY | DIFFERENCE VALUE > THRESHOLD 3, 3 TIMES IN A ROW | ZEROTH RELIABILITY |

| 340 RELIABILITY | 342 FORGETTING FACTOR |
|---|---|
| THIRD RELIABILITY | $\beta 1$ |
| SECOND RELIABILITY | $\beta 2 \ (\beta 2 < \beta 1)$ |
| FIRST RELIABILITY | $\beta 3 \ (\beta 3 < \beta 2)$ |
| ZEROTH RELIABILITY | $\beta 4 \ (\beta 4 < \beta 3)$ |

| PRESENT RELIABILITY | CONDITIONS | RELIABILITY AFTER CHANGE |
|---|---|---|
| ZEROTH RELIABILITY | DIFFERENCE VALUE ≦ THRESHOLD 1, DISTRIBUTED VALUE ≦ THRESHOLD 4, 10 TIMES IN A ROW | FIRST RELIABILITY |
| | DIFFERENCE VALUE ≦ THRESHOLD 1, DISTRIBUTED VALUE > THRESHOLD 4 | ZEROTH RELIABILITY |
| FIRST RELIABILITY | DIFFERENCE VALUE ≦ THRESHOLD 2, DISTRIBUTED VALUE ≦ THRESHOLD 4, 10 TIMES IN A ROW | SECOND RELIABILITY |
| | DIFFERENCE VALUE ≦ THRESHOLD 2, DISTRIBUTED VALUE > THRESHOLD 4 | FIRST RELIABILITY |
| SECOND RELIABILITY | DIFFERENCE VALUE ≦ THRESHOLD 3, DISTRIBUTED VALUE ≦ THRESHOLD 4, 10 TIMES IN A ROW | THIRD RELIABILITY |
| | DIFFERENCE VALUE ≦ THRESHOLD 3, DISTRIBUTED VALUE > THRESHOLD 4 | SECOND RELIABILITY |

FIG.17

| RUNNING CONDITION | RELIABILITY | FORGETTING FACTOR |
|---|---|---|
| STOP STATE | | $\alpha 1$ |
| STRAIGHT RUNNING STATE | | $\alpha 2 \ (\alpha 2 < \alpha 1)$ |
| NON-STRAIGHT RUNNING STATE | THIRD RELIABILITY | $\alpha 31 \ (\alpha 31 < \alpha 2)$ |
| | SECOND RELIABILITY | $\alpha 32 \ (\alpha 32 < \alpha 31)$ |
| | FIRST RELIABILITY | $\alpha 33 \ (\alpha 33 < \alpha 32)$ |
| | ZEROTH RELIABILITY | $\alpha 34 \ (\alpha 34 < \alpha 33)$ |

76

ANGULAR VELOCITY SENSOR CORRECTING APPARATUS FOR DERIVING VALUE FOR CORRECTING OUTPUT SIGNAL FROM ANGULAR VELOCITY SENSOR, ANGULAR VELOCITY CALCULATING APPARATUS, ANGULAR VELOCITY SENSOR CORRECTING METHOD, AND ANGULAR VELOCITY CALCULATING METHOD

CROSS-REFERENCE TO RELATED APPLICATIONS

The present application claims the priority benefit of Japanese patent application number JP 2008-274871 filed Oct. 24, 2008, the disclosure of which is incorporated herein by reference.

BACKGROUND OF THE INVENTION

1. Field of the Invention

The present invention relates to an angular velocity sensor correcting technique and an angular velocity calculating technique and, more particularly, to an angular velocity sensor correcting apparatus, an angular velocity calculating apparatus, an angular velocity sensor correcting method, and an angular velocity calculating method for deriving a value for correcting an output signal from an angular velocity sensor.

2. Description of the Related Art

In a navigation apparatus for a vehicle, generally, an optimum position is estimated by combining a position calculated by self-contained navigation and a position calculated from a Global Positioning System (GPS). In the self-contained navigation, by updating a measured position of last time on the basis of a speed pulse indicative of the velocity of the vehicle and turn angle velocity of the vehicle measured by an angular velocity sensor, the present position is calculated. By a navigation apparatus of such a system, the position of the vehicle can be derived by self-contained navigation even in a tunnel, an underground parking area, and an area between tall buildings where it is difficult to receive radio waves from a GPS satellite. An angular velocity ω accompanying a turn of a vehicle is derived by the following equation:

$$\omega = (Vout - Voffset)/S \quad (1)$$

In the equation, Vout denotes output voltage of an angular velocity sensor, Voffset denotes an offset value of the angular velocity sensor, and S (mV/deg/sec) denotes an angular velocity conversion coefficient of the angular velocity sensor.

To accurately obtain angular velocity, an offset value and the angular velocity conversion coefficient of the angular velocity sensor have to be obtained accurately. The angular velocity conversion coefficient of the angular velocity sensor varies, generally, according to the individual difference of the angular velocity sensor and the angle of attachment to the vehicle of the angular velocity sensor. There is the possibility that the offset value changes according to a temperature change. That is, the offset value is subjected to the influences of temperature rise caused by heat generation of a substrate or the like used for a navigation apparatus for a vehicle and heat generation of a vehicle engine or the like in the case where the navigation apparatus for a vehicle is attached to the dashboard of the vehicle. Hitherto, an offset value of an angular velocity sensor is corrected by using an output voltage from the angular velocity sensor at the time of stop or straight running of the vehicle when the angular velocity is "0". However, in the case where the frequency of stop of the vehicle is low such as running on an expressway or long-time running in an area where a traffic amount is small, it is difficult to periodically correct the offset value of the angular velocity sensor. The precision of the offset value tends to deteriorate. Correction of an offset value at the time of straight running when an output voltage from an angular velocity sensor accurately is "0" is easily influenced by the shape of a road and the driving state of the driver, so that it is difficult to periodically perform the correction. The angular velocity conversion coefficient of the angular velocity sensor is derived from an orientation change amount in a unit period and an output voltage of the angular velocity sensor. Consequently, as it is obvious from the equation (1), the angular velocity conversion coefficient of the angular velocity sensor is influenced by an error of the offset value.

A technique of correcting an offset of the angular velocity sensor and the angular velocity conversion coefficient even during running other than the straight running is proposed. In the technique, on the basis of an average value of output voltages of the angular velocity sensor in a predetermined period and the orientation change amount of the vehicle in the period in which the average value is calculated, the offset value and the angular velocity conversion coefficient of the angular velocity sensor are corrected. Concretely, an offset value Voffset of the angular velocity sensor is derived as follows:

$$Voffset = 1/n \cdot \Sigma Vout - 1/\Delta t \cdot \Delta \theta / n \cdot S \quad (2)$$

In the equation, "n" denotes the number of samples of the output voltage of the angular velocity sensor, Δt (sec) denotes sampling interval, and Δθ(deg) denotes an orientation change amount. The orientation change amount is obtained on the basis of a GPS orientation obtained from a GPS satellite or map data. The angular velocity conversion coefficient of the angular velocity sensor is derived as follows in a state where a change amount of a corrected offset amount is small, that is, in a stable state:

$$S = (1/n \cdot \Sigma Vout - Voffset) \cdot n/\Delta \theta \cdot \Delta t \quad (3)$$

In the equation, Voffset is known and a constant in a stable state where a change amount of a corrected offset amount is small as evidenced in, for example, Japanese laid open Patent Application number 2001-330454.

Under such situations, when the number of samples is increased since Voffset in the equation (3) is not stable until the stable state is obtained in which the change amount of the offset value is small with respect to the angular velocity conversion coefficient of the angular velocity sensor, there is the possibility that an error in the angular velocity conversion coefficient increases. Until the offset value becomes stable, generally, it takes 30 minutes to one hour or longer since startup. Consequently, for example, in running of about 30 minutes or less, it is very difficult to accurately correct the angular velocity conversion coefficient of the angular velocity sensor, and precision of deriving the angular velocity is not high. To improve the precision of deriving the angular velocity in short time since startup, it is requested to derive the offset value of the angular velocity sensor in short time.

In the equation (3) for deriving the angular velocity conversion coefficient of the angular velocity sensor, in the case where the orientation change amount Δθ is obtained from the GPS orientation obtained from the GPS satellite, the precision of the GPS orientation deteriorates depending on the reception state of radio waves from the GPS satellite, so that an error included in the angular velocity conversion coefficient increases. In the case where the orientation change amount Δθ is obtained on the basis of the map data in the equation (3), the road orientation based on the map data and the vehicle running orientation do not always match perfectly, so that an error included in the angular velocity conversion coefficient increases. Also in those cases, reduction in an error included in the angular velocity conversion coefficient is requested.

SUMMARY OF THE INVENTION

The present invention has been achieved in view of such situations and a general purpose of the invention is to provide a technique of improving precision of deriving angular velocity even in short time since startup.

To solve the problem, an angular velocity sensor correcting apparatus as an aspect of the present invention includes: an obtaining unit operative to obtain measurement data of an object measured on the basis of a signal from a GPS satellite and angular velocity of the object output from an angular velocity sensor; an angular velocity conversion coefficient deriving unit operative to sequentially derive a temporary angular velocity conversion coefficient of the angular velocity sensor on the basis of the measurement data and the angular velocity obtained by the obtaining unit; and an angular velocity conversion coefficient filter process unit operative to derive an angular velocity conversion coefficient of the angular velocity sensor for correcting the angular velocity output from the angular velocity sensor by executing statistical process on the temporary angular velocity conversion coefficient of the angular velocity sensor sequentially derived by the angular velocity conversion coefficient deriving unit. The angular velocity conversion coefficient filter process unit changes a forgetting factor in the statistical process in accordance with a difference between an angular velocity conversion coefficient of the angular velocity sensor derived in the past in the angular velocity conversion coefficient filter process unit and an average value of temporary sensitive coefficients of the angular velocity sensor sequentially derived by the angular velocity conversion coefficient deriving unit.

According to the aspect, the forgetting factor in the statistical process is changed according to the difference between the angular velocity conversion coefficient derived in the past and the average value of temporary angular velocity conversion coefficients, so that the forgetting factor adapted to the present temporary angular velocity conversion coefficient can be set.

The angular velocity conversion coefficient filter process unit may include: a reliability deriving unit operative to specify a higher reliability step by step from reliabilities specified in a plurality of steps as the difference between the angular velocity conversion coefficient of the angular velocity sensor derived in the past in the angular velocity conversion coefficient filter process unit and an average value of temporary angular velocity conversion coefficients of the angular velocity sensor sequentially derived by the angular velocity conversion coefficient deriving unit decreases; and a forgetting factor setting unit operative to use, at the time of the statistical process, a forgetting factor by which the influence of a temporary angular velocity conversion coefficient obtained in the past in derivation of the angular velocity conversion coefficient of the angular velocity sensor decreases as the specified reliability increases. In this case, the higher the reliability is, the larger the influence of the new temporary angular velocity conversion coefficient is. Consequently, while suppressing deterioration in the precision of the statistical process, a new angular velocity conversion coefficient can be reflected in the angular velocity conversion coefficient.

The reliability deriving unit in the angular velocity conversion coefficient filter process unit may specify a higher reliability step by step as a distributed value of a temporary angular velocity conversion coefficient of the angular velocity sensor sequentially derived by the angular velocity conversion coefficient deriving unit becomes smaller even when the difference between the angular velocity conversion coefficient of the angular velocity sensor derived in the past in the angular velocity conversion coefficient filter process unit and the average value of the temporary angular velocity conversion coefficients of the angular velocity sensor sequentially derived by the angular velocity conversion coefficient deriving unit are the same. In this case, the reliability is specified in consideration of not only the difference but also the distributed value. Consequently, the influence of variations in the temporary angular velocity conversion coefficient can be reflected in the reliability.

Another embodiment of the present invention relates to an angular velocity calculating apparatus. The apparatus includes: an obtaining unit operative to obtain measurement data of an object measured on the basis of a signal from a GPS satellite and angular velocity of the object output from an angular velocity sensor; an estimating unit operative to estimate a running condition of the object on the basis of the measurement data and the angular velocity obtained in the obtaining unit; an offset value deriving unit operative to sequentially derive a temporary offset value of the angular velocity sensor while changing combination of the measurement data and the angular velocity obtained by the obtaining unit in accordance with the running condition of the object estimated by the estimating unit; an offset value filter process unit operative to derive an offset value of the angular velocity sensor for correcting the angular velocity output from the angular velocity sensor by executing statistical process on the temporary offset value of the angular velocity sensor sequentially derived by the offset value deriving unit; an angular velocity conversion coefficient deriving unit operative to sequentially derive a temporary angular velocity conversion coefficient of the angular velocity sensor on the basis of the measurement data and the angular velocity obtained by the obtaining unit; an angular velocity conversion coefficient filter process unit operative to derive an angular velocity conversion coefficient of the angular velocity sensor for correcting the angular velocity output from the angular velocity sensor by executing statistical process on the temporary angular velocity conversion coefficient of the angular velocity sensor sequentially derived by the angular velocity conversion coefficient deriving unit; and an angular velocity converting unit operative to correct the angular velocity of the object obtained by the obtaining unit using the angular velocity conversion coefficient of the angular velocity sensor derived by the angular velocity conversion coefficient filter process unit and the offset value of the angular velocity sensor derived by the offset value filter process unit. The offset value filter process unit changes a forgetting factor in the statistical process in accordance with the running condition of the object estimated by the estimating unit, and the angular velocity conversion coefficient filter process unit changes a forgetting factor in the statistical process in accordance with a difference between an angular velocity conversion coefficient of the angular velocity sensor derived in the past in the angular velocity conversion coefficient filter process unit and an average value of temporary sensitive coefficients of the angular velocity sensor sequentially derived by the angular velocity conversion coefficient deriving unit.

In the aspect, the offset value is derived by performing the statistical process on the temporary offset value while using the forgetting factor according to the running condition, and the angular velocity conversion coefficient is derived by performing the statistical process on the temporary angular velocity conversion coefficient while using the forgetting factor according to reliability. Thus, even in short time after startup, the precision of deriving the angular velocity can be improved.

Further another aspect of the present invention relates to an angular velocity sensor correcting method. The method includes: obtaining measurement data of an object measured on the basis of a signal from a GPS satellite and angular velocity of the object output from an angular velocity sensor; sequentially deriving temporary angular velocity conversion coefficients of the angular velocity sensor on the basis of the measurement data and the angular velocity obtained; and deriving an angular velocity conversion coefficient of the angular velocity sensor for correcting the angular velocity output from the angular velocity sensor by executing statistical process on the temporary angular velocity conversion coefficient of the angular velocity sensor sequentially derived. In deriving the angular velocity conversion coefficient of the angular velocity sensor, a forgetting factor in the statistical process is changed in accordance with a difference between an angular velocity conversion coefficient of the angular velocity sensor derived in the past and an average value of temporary sensitive coefficients of the angular velocity sensor sequentially derived.

Further another aspect of the present invention relates to an angular velocity calculating method. The method includes: obtaining measurement data of an object measured on the basis of a signal from a GPS satellite and angular velocity of the object output from an angular velocity sensor; estimating a running condition of the object on the basis of the measurement data and the angular velocity obtained; sequentially deriving a temporary offset value of the angular velocity sensor while changing combination of the measurement data and the angular velocity obtained in accordance with the running condition of the object estimated; deriving an offset value of the angular velocity sensor for correcting the angular velocity output from the angular velocity sensor by executing statistical process on the temporary offset value of the angular velocity sensor sequentially derived; sequentially deriving a temporary angular velocity conversion coefficient of the angular velocity sensor on the basis of the measurement data and the angular velocity obtained in the obtaining step; deriving an angular velocity conversion coefficient of the angular velocity sensor for correcting the angular velocity output from the angular velocity sensor by executing statistical process on the temporary angular velocity conversion coefficient of the angular velocity sensor sequentially derived; and correcting the angular velocity of the object obtained in the obtaining step using the angular velocity conversion coefficient of the angular velocity sensor derived and the offset value of the angular velocity sensor derived. In deriving the offset value of the angular velocity sensor, a forgetting factor in the statistical process is changed in accordance with the running condition of the object estimated. In the deriving the angular velocity conversion coefficient of the angular velocity sensor, a forgetting factor in the statistical process is changed in accordance with a difference between an angular velocity conversion coefficient of the angular velocity sensor derived in the past and an average value of temporary sensitive coefficients of the angular velocity sensor sequentially derived.

As aspects of the present invention, the components may be arbitrarily combined and the expression of the present invention may be changed among methods, apparatus, systems, recording media, computer programs, and the like.

BRIEF DESCRIPTION OF THE DRAWINGS

FIG. 12 is a diagram showing data structure of a table stored in the reliability determining unit in FIG. 10;

FIG. 13 is a diagram showing data structure of a table stored in a forgetting factor setting unit in FIG. 10;

FIG. 16 is a diagram showing data structure of a table stored in a reliability determining unit in FIG. 15; and FIG. 17 is a diagram showing data structure of a table stored in a forgetting factor setting unit in a fifth embodiment of the present invention.

DETAILED DESCRIPTION

First Embodiment

Figure 1:
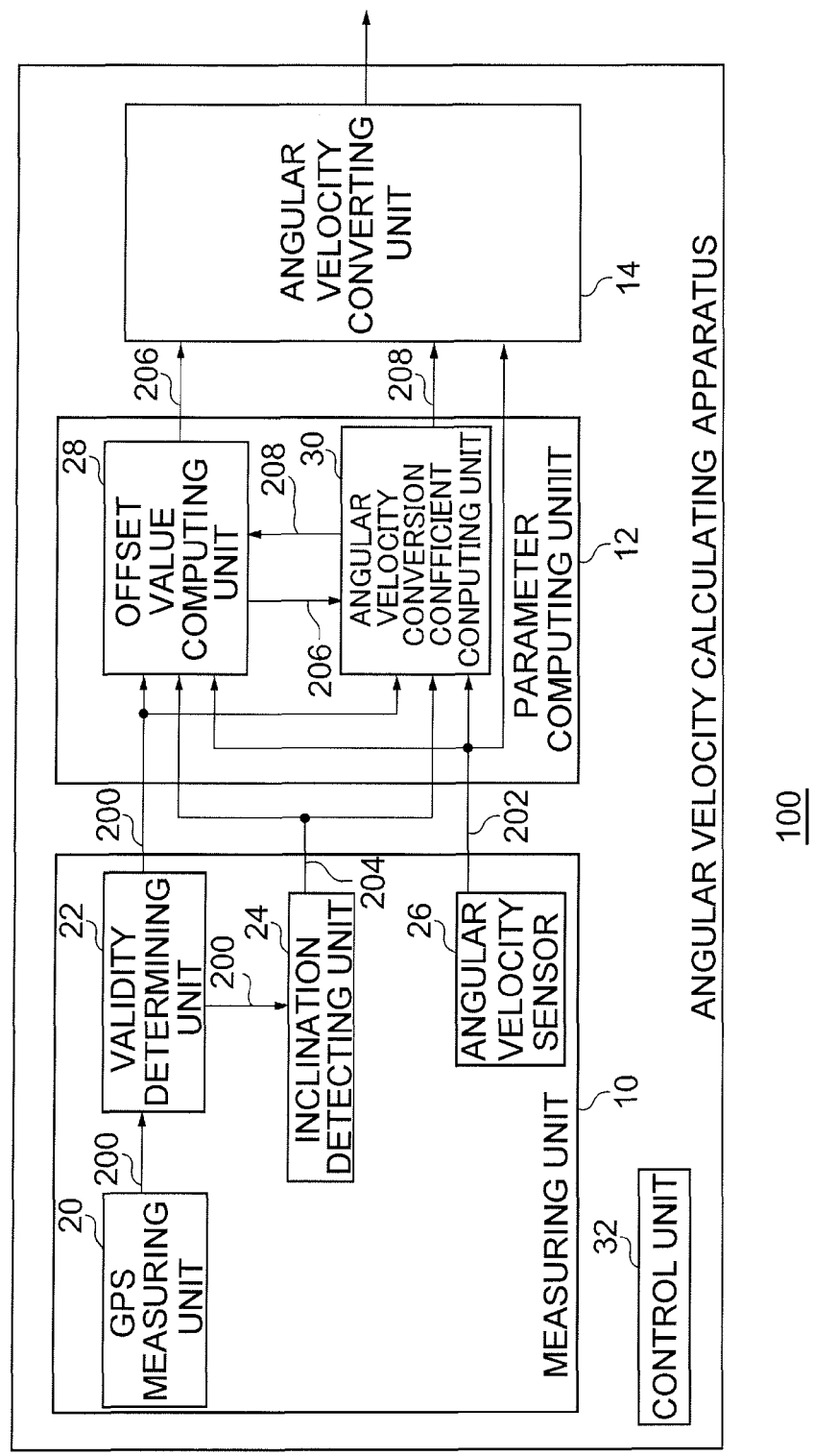
FIG. 1 is a diagram showing the configuration of an angular velocity calculating apparatus as a first embodiment of the present invention.

Prior to concrete description of the present invention, outline will be described first. An embodiment of the present invention relates to an angular velocity calculating apparatus mounted on a vehicle or the like and for deriving angular velocity accompanying turn of a vehicle. The angular velocity calculating apparatus derives angular velocity using an offset value and an angular velocity conversion coefficient for an output voltage from an angular velocity sensor. As described above, for a predetermined period since startup, the angular velocity sensor is influenced by fluctuations in temperature, so that an offset value is not accurately derived. An error in the offset value exerts an influence on calculation precision of the angular velocity conversion coefficient. As a result, in such a state, precision of angular velocity deteriorates. To address the problem, the angular velocity calculating apparatus of the embodiment executes the following process.

The angular velocity calculating apparatus receives output voltage from the angular velocity sensor mounted on the vehicle and receives measurement data from a GPS receiver mounted on the vehicle. The output voltage from the angular velocity sensor corresponds to angular velocity of the vehicle. The measurement data includes the orientation of the vehicle, velocity of the vehicle, altitude of the vehicle, and the like. The angular velocity calculating apparatus estimates a running condition of the vehicle on the basis of the measurement data and the output voltage. As the running condition, for example, any of a stop state, a straight running condition, and a non-straight-running condition is specified. The angular velocity calculating apparatus also sequentially derives a temporary offset value by a deriving method according to the running condition. Further, the angular velocity calculating apparatus executes a filtering process on the temporary offset value sequentially derived. In the embodiment, the filter corresponds to a low-pass filter. A forgetting factor which is set in the filter is determined according to the running condition. For example, in the stop state or the straight running condition, since the precision of the temporary offset value is high, a forgetting factor which reduces the influence of a value in the past is set. On the other hand, in the non-straight-running condition, the precision of the temporary offset value is low, so that the forgetting factor which increases the influence of a value in the past is set. The output value of the filter corresponds to the offset value.

The angular velocity calculating apparatus sequentially calculates a temporary angular velocity conversion coefficient on the basis of the measurement data and the output voltage. The angular velocity calculating apparatus executes the filtering process on the temporary angular velocity conversion coefficient which is sequentially derived in a manner similar to the case of the offset value. The forgetting factor to be set in the filter is set in accordance with the operation period of the angular velocity calculating apparatus. For example, immediately after startup, a forgetting factor that decreases the influence of a value in the past is set. On the other hand, after a predetermined period since startup, a forgetting factor that increases the influence of a value in the past is set. The output value of the filter corresponds to the angular velocity conversion coefficient. Finally, the angular velocity calculating apparatus calculates angular velocity on the basis of the output voltage from the angular velocity sensor, the offset value, and the angular velocity conversion coefficient.

FIG. 1 shows the configuration of an angular velocity calculating apparatus 100 according to a first embodiment of the present invention. The angular velocity calculating apparatus 100 includes a measuring unit 10, a parameter calculating apparatus 12, an angular velocity converting unit 14, and a control unit 32. The measuring unit 10 includes a GPS measuring unit 20, a validity determining unit 22, an inclination detecting unit 24, and an angular velocity sensor 26. The parameter calculating apparatus 12 includes an offset value computing unit 28 and an angular velocity conversion coefficient computing unit 30. As signals, GPS measurement data 200, an output signal 202, an inclination angle 204, an offset value 206, and an angular velocity conversion coefficient 208 are included.

The GPS measuring unit 20 receives a signal from a not-shown GPS satellite and calculates the GPS measurement data 200. The GPS measurement data 200 includes longitude and latitude, GPS altitude as the altitude of the vehicle, GPS speed as running speed, GPS orientation as the orientation of the vehicle, Position Dilution Precision (PDOP), the number of satellites caught, and the like. The PDOP is an index indicating how an error of the GPS satellite position in the GPS measurement data 200 is reflected in a reception point position and corresponds to a measurement error. The GPS measurement data 200 may include other data. Since it is sufficient to calculate the GPS measurement data 200 by a known technique, description of calculation will not be described here. The GPS measuring unit 20 calculates the GPS measurement data 200 every sampling interval, that is, periodically. The GPS measuring unit 20 sequentially outputs the GPS measurement data 200 to the validity determining unit 22.

The validity determining unit 22 sequentially receives the GPS measurement data 200 from the GPS measuring unit 20. The validity determining unit 22 determines effectiveness of each of the GPS measurement data 200 from the GPS measurement data 200. For example, when the value of PDOP is equal to or less than a first threshold and the GPS speed is equal to or larger than a second threshold, the validity determining unit 22 determines that a GPS orientation corresponding to the values is effective. When the above-described conditions are not satisfied, the validity determining unit 22 determines that the corresponding GPS orientation is invalid. The reason is that, generally, when the value of the PDOP is large or the GPS speed is low, there is tendency that the precision of the GPS orientation is low. More concretely, when the value of PDOP is 6 or less and the GPS speed is 20 km/h or higher, the validity determining unit 22 expresses the effectiveness of the GPS orientation by a flag.

When the GPS speed is equal to or larger than a third threshold value, the validity determining unit 22 determines that the GPS speed is valid. The third threshold may be the same as the second threshold. Further, when the difference in the GPS altitude in a predetermined period is equal to or less than a fourth threshold, the validity determining unit 22 determines that the GPS altitude is valid. As a result of such a process, the validity determining unit 22 adds a flag indicative of validity or invalidity to each of the values such as the GPS orientation included in the GPS measurement data 200 (hereinbelow, the GPS measurement data 200 to which the flag is added will be also called "GPS measurement data 200"). The validity determining unit 22 sequentially outputs the GPS measurement data 200 to the inclination detecting unit 24, the offset value computing unit 28, and the angular velocity conversion coefficient computing unit 30.

The inclination detecting unit 24 sequentially receives the GPS measurement data 200, particularly, the GPS altitude included in the GPS measurement data 200 from the validity determining unit 22. The inclination detecting unit 24 detects average inclination angle (hereinbelow, called "inclination angle 204") of the vehicle in the sampling interval on the basis of the sequentially input GPS altitude. Concretely, the inclination detecting unit 24 sequentially calculates the difference in continuous GPS altitudes, averages them, and divides an average value by the sampling interval, thereby deriving the inclination angle 204. The interval of the continuous GPS altitudes corresponds to the sampling interval. The inclination detecting unit 24 outputs the inclination angle 204 to the offset value computing unit 28 and the angular velocity conversion coefficient computing unit 30.

The angular velocity sensor 26 corresponds to, for example, a gyro apparatus such as a vibration gyro apparatus and detects a change in the running direction of the vehicle as a relative angle change of the vehicle. That is, the angular velocity sensor 26 detects a turn angular velocity of the vehicle. The detected angular velocity is output as, for example, an analog signal of 0 V to 5 V. A positive angular velocity corresponding to a clockwise turn is output as a deviation voltage from 2.5 V to the 5 V side, and a negative angular velocity corresponding to a counterclockwise turn is output as a deviation voltage from 2.5 V to the 0 V side. The voltage of 2.5 V is the offset value of the angular velocity, that is, zero point, which is influenced by a temperature or the like and drifts.

The angular velocity conversion coefficient (mV/deg/sec) as the degree of deviation of the angular velocity from 2.5 V is determined as a predetermined value which lies in an allowable range of error in a horizontal state. The sources of the allowable error are the individual differences and aging changes of gyro apparatus, the influence of temperature, and the like. A voltage value of the gyro apparatus is A/D converted, for example, at a sampling interval of 100 msec by a not-shown AD (Analog to Digital) converter, and a digital signal as a resultant signal is output. The digital signal corresponds to the output voltage. In the following, as the digital signal, the term of the output signal 202 will be used. As a gyro apparatus, it is sufficient to use a known technique. The description of the gyro apparatus will not be given here. The angular velocity sensor 26 outputs the output signal 202 to the offset value computing unit 28, the angular velocity conversion coefficient computing unit 30, and the angular velocity converting unit 14.

The offset value computing unit 28 receives the GPS measurement data 200 from the validity determining unit 22, the inclination angle 204 from the inclination detecting unit 24, and the output signal 202 from the angular velocity sensor 26. The offset value computing unit 28 also receives the angular velocity conversion coefficient 208 from the angular velocity conversion coefficient computing unit 30. The offset value computing unit 28 calculates an offset value (hereinbelow, called "offset value 206") of the angular velocity sensor 26 on the basis of the GPS measurement data 200, the output signal 202, the inclination angle 204, and the angular velocity conversion coefficient 208. The details of the process in the offset value computing unit 28 will be described later. The offset value computing unit 28 outputs the offset value 206 to the angular velocity converting unit 14.

The angular velocity conversion coefficient computing unit 30 receives the GPS measurement data 200 from the validity determining unit 22, the inclination angle 204 from the inclination detecting unit 24, and the output signal 202 from the angular velocity sensor 26. The angular velocity conversion coefficient computing unit 30 also receives the offset value 206 from the offset value computing unit 28. The angular velocity conversion coefficient computing unit 30 calculates angular velocity conversion coefficient (hereinbelow, called the above-described "angular velocity conversion coefficient 208") of the angular velocity sensor 26 on the basis of the GPS measurement data 200, the output signal 202, the inclination angle 204, and the offset value 206. The details of the process in the angular velocity conversion coefficient computing unit 30 will be described later. The angular velocity conversion coefficient computing unit 30 outputs the angular velocity conversion coefficient 208 to the angular velocity converting unit 14.

The angular velocity converting unit 14 receives the output signal 202 from the angular velocity sensor 26, the offset value 206 from the offset value computing unit 28, and the angular velocity conversion coefficient 208 from the angular velocity conversion coefficient computing unit 30. The angular velocity converting unit 14 calculates angular velocity w of the vehicle by calculating the above-described equation (1) on the basis of the output signal 202, the offset value 206, and the angular velocity conversion coefficient 208. The angular velocity converting unit 14 outputs the angular velocity w. The control unit 32 controls the operation of the entire angular velocity calculating apparatus 100.

The configuration in hardware is realized by a CPU, a memory, and another LSI of an arbitrary computer. The configuration in software is realized by a program loaded to a memory or the like. In the diagram, the functional blocks realized by coordination of the hardware and software configurations are drawn. Therefore, it is understood by a person skilled in the art that the functional blocks can be realized in various forms such as a form of only hardware, a form of only software, and a form of a combination of the hardware and software.

Figure 2:
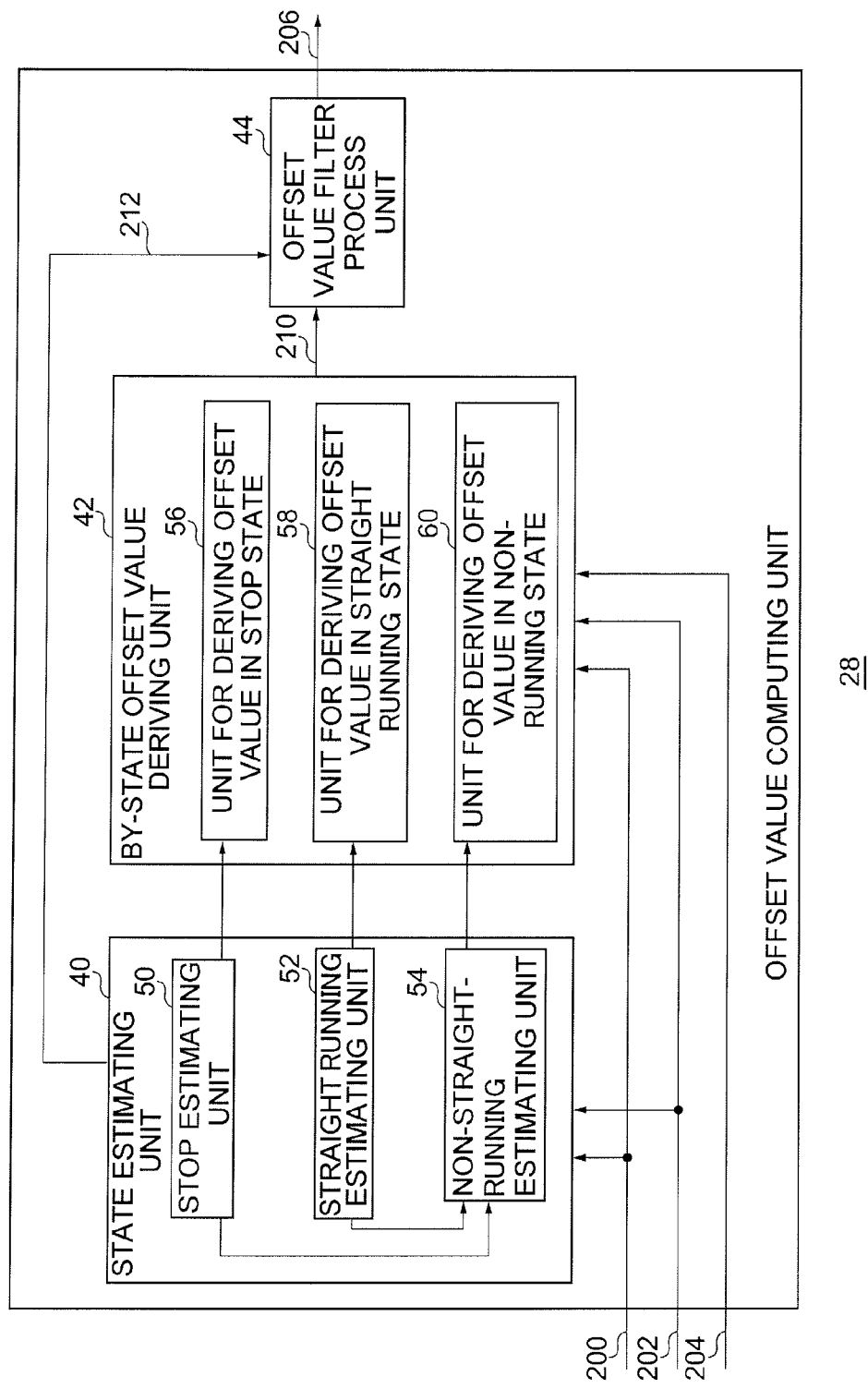
FIG. 2 is a diagram showing the configuration of an offset value computing unit in FIG. 1.

FIG. 2 shows the configuration of the offset value computing unit 28. The offset value computing unit 28 includes a state estimating unit 40, a by-state offset value deriving unit 42, and an offset value filter process unit 44. The state estimating unit 40 includes a stop-state estimating unit 50, a straight running estimating unit 52, and a non-straight-running estimating unit 54. The by-state offset value deriving unit 42 includes a unit 56 for deriving an offset value in a stop state, a unit 58 for deriving an offset value in a straight running condition, and a unit 60 for deriving an offset value in a non-straight-running condition. Further, as signals, a temporary offset value 210 and running condition information 212 are included.

The state estimating unit 40 receives the GPS measurement data 200, the output signal 202, and the inclination angle 204. The state estimating unit 40 estimates the running condition of the vehicle by the stop-state estimating unit 50, the straight running estimating unit 52, and the non-straight-running estimating unit 54. As the running condition of the vehicle, either a state where the vehicle stops or runs straight or the other state, that is, a non-straight-running condition is estimated. The state estimating unit 40 outputs the determination result as running condition information 212 to the offset value filter process unit 44.

The stop-state estimating unit 50 obtains the GPS measurement data 200 determined as valid by the not-shown validity determining unit 22. The stop-state estimating unit 50 extracts the GPS speed from the GPS measurement data 200 and confirms whether the GPS speed is "0" or not. On the other hand, the stop-state estimating unit 50 calculates a variance value of the output signal 202 in a predetermined period and compares the variance value with a fifth threshold. In the case where the GPS speed is 0 and the variance value is smaller than the fifth threshold, the stop-state estimating unit 50 determines that the vehicle is in the stop state. As described above, in the case where the GPS speed is low, there is the tendency that the precision is low. Consequently, using also the variance value of the output signal 202, the stop-state estimating unit 50 determines the stop state. The predetermined period is, for example, one second as the sampling interval of the GPS speed. In the predetermined period, when the variance value of the output signal 202 is small, a stable state in which there is no vibration in the vehicle is estimated. When the stop state is not determined, the stop-state estimating unit 50 outputs the determination result to the non-straight-running estimating unit 54.

The straight running estimating unit 52 obtains the GPS measurement data 200 determined as valid by the not-shown validity determining unit 22. The straight running estimating unit 52 extracts the GPS orientation from the GPS measurement data 200 and derives a change in the predetermined period of the GPS orientation (hereinbelow, called "GPS orientation change"). Further, the straight running estimating unit 52 confirms whether the GPS orientation change is "0" or not. The straight running estimating unit 52 calculates a variance value of the output signal 202 in the predetermined period and compares the variance value with a sixth threshold. The sixth threshold may be the same as the fifth threshold. The predetermined period is set, for example, as a period in which the GPS orientation change is continuously 0.

When the GPS orientation change is 0 and the variance value is smaller than the sixth threshold, the straight running estimating unit 52 determines that the vehicle is in the straight running condition. In the predetermined period, when the variance value of the output signal 202 is small, a straight running condition in which there is no influence of a subtle meander or the like is estimated. Although it depends on the driving state of the driver and road shapes, for example, in urban areas and the like, the frequency of detecting the straight running condition is generally lower than that of determination of the stop state by the stop-state estimating unit 50, and the period of the detection is about a few seconds. In the case where the straight running condition is not determined, the straight running estimating unit 52 outputs the result to the non-straight-running estimating unit 54. In the case where the stop-state estimating unit 50 estimates the stop state and the straight running estimating unit 52 determines the straight running condition, priority is given to the determination result of the stop-state estimating unit 50. In the case where the non-straight-running estimating unit 54 receives the result that the vehicle is not in the stop state from the stop-state estimating unit 50 and receives the result that the vehicle is not in the straight running condition from the straight running estimating unit 52, the non-straight-running estimating unit 54 determines that the vehicle is in the non-straight-running condition.

The by-state offset value deriving unit 42 receives the GPS measurement data 200, the output signal 202, the inclination angle 204, and the angular velocity conversion coefficient 208. The by-state offset value deriving unit 42 sequentially derives the temporary offset value 210 of the angular velocity sensor 26 in accordance with the running condition of the vehicle estimated by the state estimating unit 40. In the case where the stop state is determined by the stop-state estimating unit 50, the unit 56 for deriving an offset value in the stop state sequentially derives the temporary offset value 210 on the basis of the output signal 202. In the case where the straight running estimating unit 52 determines the straight running condition, the unit 58 for deriving an offset value in the straight running condition sequentially derives the temporary offset value 210 on the output signal 202.

In the case where the unit 58 for deriving an offset value in the straight running condition determines the non-linear running condition, the unit 60 for deriving an offset value in the non-linear running condition sequentially derives the temporary offset value 210 on the basis of the GPS measurement data 200, the output signal 202, the inclination angle 204, and the angular velocity conversion coefficient 208. That is, according to the running condition of the vehicle, the unit 60 for deriving an offset value in the non-straight-running condition derives the temporary offset value 210 from the unit 56 for deriving an offset value in the stop state while changing a combination of the GPS measurement data 200, the output signal 202, and the like.

In the case where the stop state is determined, the unit 56 for deriving an offset value in the stop state sequentially derives the temporary offset value 210 of the angular velocity sensor 26 on the basis of the output signal 202. Concretely, using the fact that the turn angular velocity of the vehicle becomes "0" at the time of stop, the unit 56 for deriving an offset value in the stop state calculates an average value of the output signal 202 as the temporary offset value 210. When the straight running condition is determined, the unit 58 for deriving an offset value in the straight running condition sequentially derives the temporary offset value 210 of the angular velocity sensor 26 on the basis of the output signal 202. Concretely, since the turn angular velocity of the vehicle is 0 in this case as well, the unit 58 for deriving an offset value in the straight running condition calculates the average value of the output signal 202 as the temporary offset value 210.

In the case where the non-straight-running condition is determined, the unit 60 for deriving an offset value in the non-straight-running condition sequentially derives, for example, the temporary offset value 210 in the sampling interval of the GPS orientation on the basis of the GPS orientation, the inclination angle 204, the output signal 202, and the angular velocity conversion coefficient 208 in the GPS measurement data 200. The temporary offset value 210 is derived as follows:

$$Goffset = 1/n \cdot \Sigma Gout - \Delta\theta \cdot Gsensitivity \cdot \cos(\alpha) \quad (4)$$

In the equation, "n" denotes the number of samples of the output signal 202 in the sampling interval of the GPS orientation, and $\Sigma Gout(mV)$ denotes a total value of the output signal 202 in the sampling interval of the GPS orientation. $\Delta\theta(deg)$ denotes a GPS orientation change amount, Gsensitivity (mV/deg/sec) denotes the angular velocity conversion coefficient 208, and $\alpha(deg)$ denotes the inclination angle 204 of the vehicle.

Usually, the angular velocity conversion coefficient 208 is input from the not-shown angular velocity conversion coefficient computing unit 30. There is the possibility that the angular velocity conversion coefficient 208 is not calculated yet in a state such as immediately after start of the angular velocity calculating apparatus 100. In such a case, the unit 60 for deriving an offset value in the non-straight running condition uses, as the initial value, the angular velocity conversion coefficient 208 determined according to the specifications of the not-shown gyro apparatus. The unit 60 for deriving an offset value in the non-straight-running condition may store the angular velocity conversion coefficient 208 from the angular velocity conversion coefficient computing unit 30 at the end of running of last time and use it as the initial value.

The offset value filter process unit 44 receives the temporary offset value 210 sequentially derived by the by-state offset value deriving unit 42. The offset value filter process unit 44 derives the offset value 206 of the angular velocity sensor 26 by executing statistical process on the temporary offset value 210. In the following, the process in the offset value filter process unit 44 will be described with reference to FIG. 3.

Figures 3, 4:
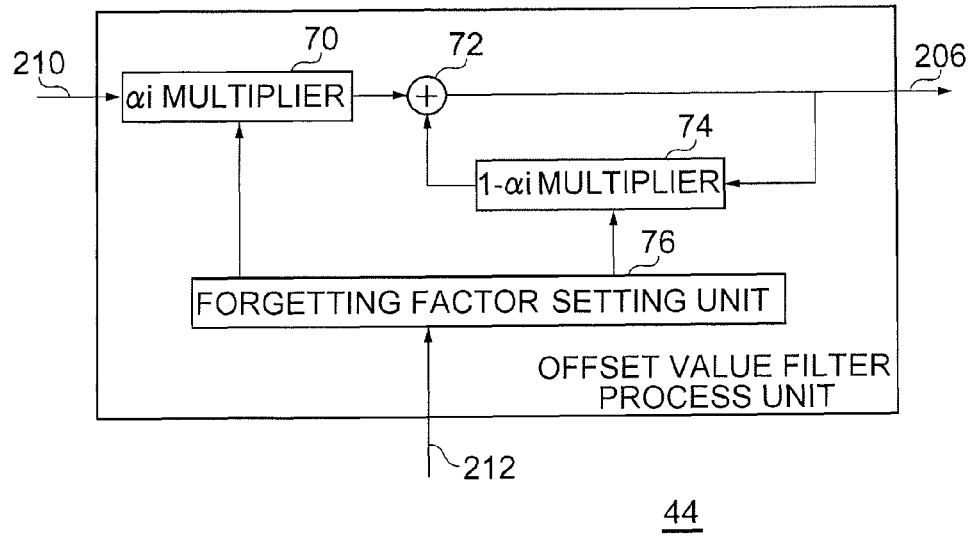
FIG. 3 is a diagram showing the configuration of an offset value filtering unit in FIG. 1.
FIG. 4 is a diagram showing data structure of a table stored in a forgetting factor setting unit in FIG. 3.

FIG. 3 shows the configuration of the offset value filter process unit 44. The offset value filter process unit 44 includes an $\alpha i$ multiplier 70, an adder 72, a $1-\alpha i$ multiplier 74, and a forgetting factor setting unit 76. As shown in the diagram, the offset value filter process unit 44 includes an Infinite Impulse Response (IIR) filter. By the IIR filter, a low-pass filter is constructed. The $\alpha i$ multiplier 70 multiplies the temporary offset value 210 with a forgetting factor "$\alpha i$". In this case, "i" denotes 1 or 2. Consequently, the forgetting factor "$\alpha i$" is generic term of $\alpha 1$ and $\alpha 2$. The generic term of $\alpha 1$ and $\alpha 2$ will be described later. The $\alpha i$ multiplier 70 outputs the multiplication result to the adder 72.

The adder 72 sequentially adds the multiplication result from the $\alpha i$ multiplier 70 and the multiplication result from the $1-\alpha i$ multiplier 74. The adder 72 sequentially outputs the addition result as the offset value 206. The $1-\alpha i$ multiplier 74 multiplies the offset value 206 with the coefficient "1−αi". "αi" in the coefficient "1−αi" is similar to "αi" in the αi multiplier 70, and will not be described here. The 1−αi multiplier 74 feeds back the multiplication result to the adder 72. The forgetting factor setting unit 76 receives the running condition information 212. The forgetting factor setting unit 76 determines the value of the forgetting factor "αi" in accordance with the state indicated by the running condition information 212. Further, the forgetting factor setting unit 76 sets the determined forgetting factor "αi" into the αi multiplier 70 and the 1−αi multiplier 74.

FIG. 4 shows the data structure of a table stored in the forgetting factor setting unit 76. As shown in the diagram, a running condition column 300 and a forgetting factor column 302 are included. The running condition column 300 includes states indicated by the running condition information 212. In the forgetting factor column 302, the forgetting factors "αi" corresponding to the states are stored. That is, the forgetting factor "α1" is associated with the stop state and the straight running condition, and the forgetting factor "α2" is associated with the non-straight running condition. The relation of α2<α1 is specified. Referring again to FIG. 3, the forgetting factor setting unit 76 selects the forgetting factor "α1" or "α2" from the states indicated by the running condition information 212 with reference to the table of FIG. 4. The forgetting factor setting unit 76 changes a forgetting factor in the filter process in accordance with the running condition of the vehicle.

The reason of changing the forgetting factor will be described. According to the configuration of the offset value filter process unit 44, Voffset(t) of the offset value 206 at time "t" is expressed as follows:

$$Voffset(t) = \alpha i Goffset(t) + (1-\alpha i)Voffset(t-1) \quad (5)$$

Goffset(t) is the temporary offset value 210 at time "t". That is, when αi increases, the influence of Goffset(t) in Voffset(t) increases, αi decreases, and the influence of Voffset(t−1) in Voffset(t) increases. It corresponds to increase in the influence of the new temporary offset value 210 in the former case, and increase in the influence of the temporary offset value 210 in the past in the latter case.

For example, in the stop state or the straight running condition, the temporary offset value 210 is derived from the output signal 202 in the state where the turn angular velocity of the vehicle is 0, so that the reliability of the temporary offset value 210 is high. On the offset value 206 sequentially derived in those states, averaging process using a weight of the newly derived temporary offset value 210 which is heavier than that in the non-straight running condition is performed. It corresponds to usage of a forgetting factor which reduces the influence of the temporary offset value 210 in the past.

On the other hand, in the non-straight-running condition, there is the possibility that an error or the like is included in Δθ obtained from the GPS orientation change amount of the equation (4) and the average inclination angle α of the vehicle. Since drifts in the temporary offset value 210 are due to the influence of temperature and the like, it is estimated that the drifts in the temporary offset value 210 have a characteristic having certain continuity. Consequently, by using a low-pass filter adapted to the characteristic, an error included in the offset value derived from the equation (4) can be absorbed. Concretely, the low-pass filter adapted to the characteristic corresponds to usage of a forgetting factor which increases the influence of the temporary offset value 210 in the past.

Figures 5, 6:
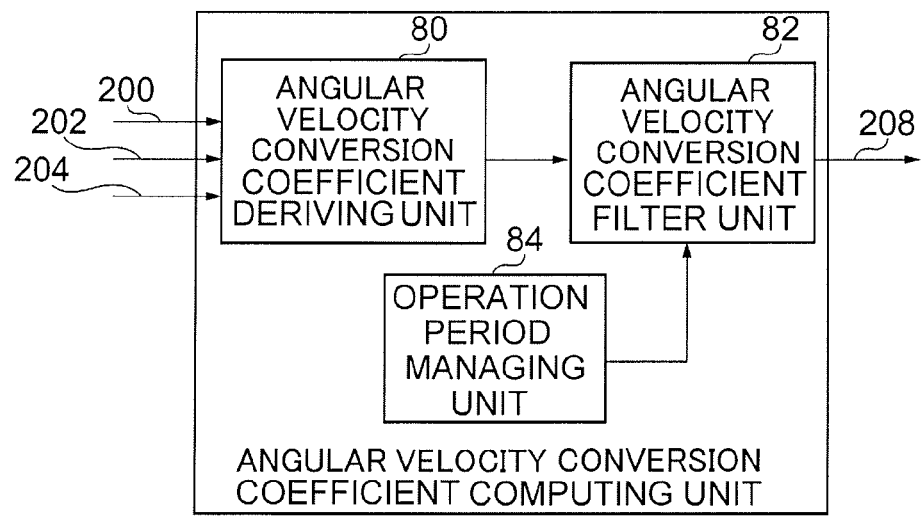
FIG. 5 is a diagram showing the configuration of an angular velocity conversion coefficient computing unit in FIG. 1.
FIG. 6 is a diagram showing data structure of a table stored in an angular velocity conversion coefficient filter unit in FIG. 5.

FIG. 5 shows the configuration of the angular velocity conversion coefficient computing unit 30. The angular velocity conversion coefficient computing unit 30 includes an angular velocity conversion coefficient deriving unit 80, an angular velocity conversion coefficient filter unit 82, and an operation period managing unit 84.

The angular velocity conversion coefficient deriving unit 80 receives the GPS measurement data 200, the output signal 202, and the inclination angle 204. The angular velocity conversion coefficient computing unit 30 also receives the offset value 206. The angular velocity conversion coefficient deriving unit 80 sequentially derives a temporary angular velocity conversion coefficient of the angular velocity sensor 26 on the basis of the GPS measurement data 200, the output signal 202, the inclination angle 204, and the offset value 206.

Concretely, in the case where it is shown that the GPS orientation is valid in the GPS measurement data 200, the angular velocity conversion coefficient deriving unit 80 calculates a temporary angular velocity conversion coefficient of the angular velocity sensor 26 in the sampling interval of the GPS orientation as follows:

$$Gsensitivity = (1/n \cdot \Sigma Gout - Goffset)/\Delta\theta/\cos(\alpha) \quad (6)$$

Goffset is input from the not-shown offset value computing unit 28. There is the possibility that the offset value 206 is not calculated yet in a state such as immediately after startup of the angular velocity calculating apparatus 100. Since the equation (6) includes division with Δθ, when Δθ is equal to or larger than a predetermined value, the angular velocity conversion coefficient is calculated. When the value of Δθ is equal to or less than the predetermined value, the angular velocity conversion coefficient deriving unit 80 outputs an angular velocity conversion coefficient corrected just before.

The angular velocity conversion coefficient filter unit 82 receives a temporary angular velocity conversion coefficient sequentially derived by the angular velocity conversion coefficient deriving unit 80. The angular velocity conversion coefficient filter unit 82 derives the angular velocity conversion coefficient 208 of the angular velocity sensor 26 by executing statistical process on the temporary angular velocity conversion coefficient. Like the offset value filter process unit 44 shown in FIG. 4, the angular velocity conversion coefficient filter unit 82 includes an IIR filter. The IIR filter serves as a low-pass filter. As a result, an error included in Δθ derived from the GPS orientation change amount in the equation (6) and the average inclination angle α of the vehicle is absorbed. The angular velocity conversion coefficient filter unit 82 sets a forgetting factor in the IIR filter on the basis of an instruction from the operation period managing unit 84.

The operation period managing unit 84 changes the forgetting factor in the angular velocity conversion coefficient filter unit 82 in accordance with the operation period of the angular velocity sensor 26. The operation period managing unit 84 instructs the angular velocity conversion coefficient filter unit 82 to use the changed forgetting factor. FIG. 6 shows the data structure of a table stored in the angular velocity conversion coefficient filter unit 82. As shown in the diagram, a condition column 310 and a forgetting factor column 312 are indicated. In the condition column 310, as conditions related to the operation period for determining the forgetting factor, "x hours or less" and "longer than x hours" are shown. In the forgetting factor column 312, the value of the forgetting factor corresponding to the condition in the condition column 310 is shown. Concretely, the forgetting factor α10 is set for the condition of "x hours or less". The forgetting factor α11 is specified for the condition for the condition of "longer than x hours". The relation of α11<α10 is specified. To be specific, for the case of x hours or less from startup, averaging process using the weight of the newly derived temporary offset value 210 heavier than that in the case longer than x hours since startup is performed.

Although the example of calculating a temporary angular velocity conversion coefficient in the sampling interval of the GPS orientation has been described above, in the case where fluctuations in Goffset and a are subtle, or the case where the value of Δθ is not equal to or larger than the predetermined value, the interval of calculation may be wider. That is, derivation of the temporary angular velocity conversion coefficient is not limited to the sampling interval of the GPS orientation.

Figure 7:
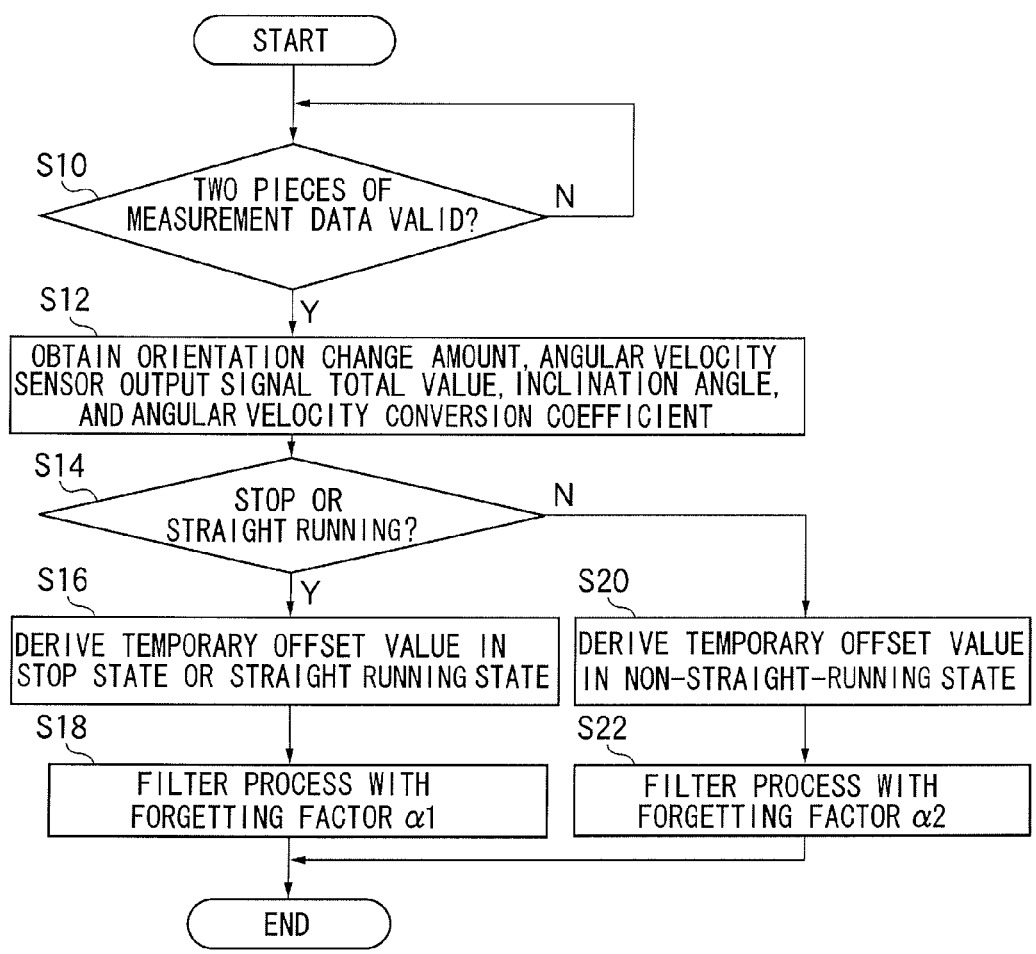
FIG. 7 is a flowchart showing procedure of deriving an offset value by the angular velocity calculating apparatus of FIG. 1.

The operation of the angular velocity calculating apparatus 100 having the above-described configuration will be described. FIG. 7 is a flowchart showing procedure of deriving an offset value by the angular velocity calculating apparatus 100. The validity determining unit 22 determines validity of two pieces of the GPS measurement data 200 measured by the GPS measuring unit 20 (S10). The two pieces of GPS measurement data 200 correspond to the GPS measurement data 200 at timings apart only by sampling interval time. When at least one of piece of GPS measurement data 200 are not valid (N in S10), the apparatus waits. When both of them are valid (Y in S10), the offset value computing unit 28 obtains the GPS orientation change amount of the vehicle in the sampling interval of the GPS measurement data 200, the total value of the output signal 202 of the angular velocity sensor 26, the inclination angle 204 of the vehicle output from the inclination detecting unit 24, and the angular velocity conversion coefficient 208 output from the angular velocity conversion coefficient computing unit 30 (S12).

The state estimating unit 40 determines whether the running condition of the vehicle is the stop state or the straight running condition on the basis of the various information obtained (S14). In the stop or straight running condition (Y in S14), the unit 56 for deriving an offset value in the stop state or the unit 58 for deriving an offset value in the straight running condition calculates the temporary offset value 210 of the angular velocity sensor 26 on the basis of the various information obtained (S16). The offset value filter process unit 44 executes the filter process with a forgetting factor al (S18). On the other hand, when the vehicle is not in the stop or straight running condition (N in S14), the unit 60 for deriving an offset value in the non-straight running condition calculates the temporary offset value 210 of the angular velocity sensor 26 on the basis of the obtained various information (S20). The offset value filter process unit 44 executes the filter process with a forgetting factor α2 (S22).

Figure 8:
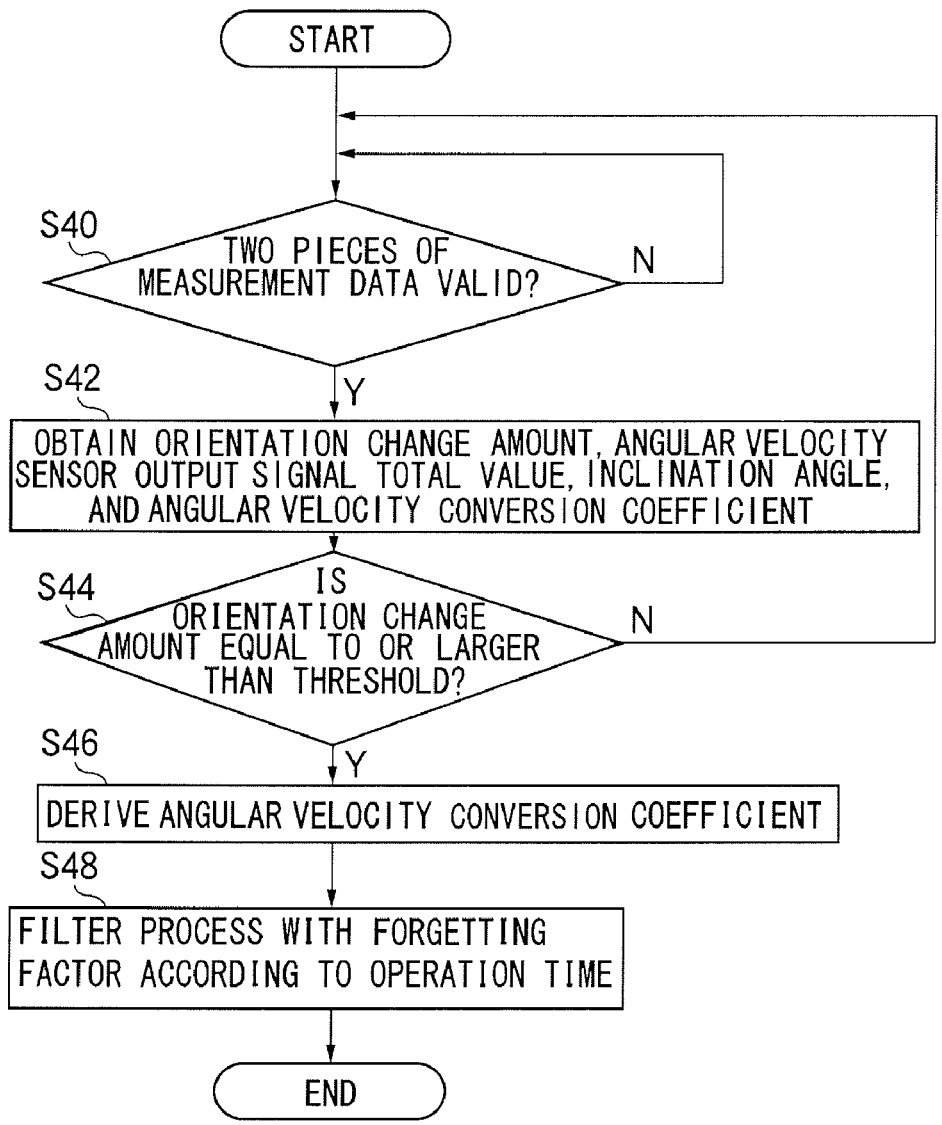
FIG. 8 is a flowchart showing procedure of deriving angular velocity conversion coefficient by the angular velocity calculating apparatus of FIG. 1.

FIG. 8 is a flowchart showing procedure of deriving an angular velocity conversion coefficient by the angular velocity calculating apparatus 100. The validity determining unit 22 determines validity of the two pieces of the GPS measurement data 200 measured by the GPS measuring unit 20 (S40). The two pieces of GPS measurement data 200 correspond to the GPS measurement data 200 at timings apart only by sampling interval time. When at least one of piece of GPS measurement data 200 are not valid (N in S40), the apparatus waits. When both of them are valid (Y in S40), the angular velocity conversion coefficient computing unit 30 obtains the GPS orientation change amount of the vehicle in the sampling interval of the GPS measurement data 200, the total value of the output signal 202 of the angular velocity sensor 26, the inclination angle 204 of the vehicle output from the inclination detecting unit 24, and the angular velocity conversion coefficient 208 output from the angular velocity conversion coefficient computing unit 30 (S42).

When the angular velocity conversion coefficient deriving unit 80 determines that the GPS orientation change amount obtained is not equal to or larger than the predetermined value (N in S44), the apparatus returns to step S40. On the other hand, when the angular velocity conversion coefficient deriving unit 80 determines that the GPS orientation change amount obtained is equal to or larger than the predetermined value (Y in S44), a temporary angular velocity conversion coefficient of the angular velocity sensor 26 is derived on the basis of the obtained various information (S46). The angular velocity conversion coefficient filter unit 82 executes the filter process on the temporary angular velocity conversion coefficient with a forgetting factor according to the operation time (S48).

In the embodiment of the present invention, by deriving the temporary offset value according to the running condition and performing the filter process on the temporary offset value using the forgetting factor according to the running condition, the offset value is derived. Even in short time after startup, an error included in the offset value can be reduced. Since an error included in the offset value is reduced, the precision of deriving the offset value can be improved. The inclination angle of the vehicle is also considered for the offset value of the angular velocity sensor, the derivation precision can be further improved. The optimum offset value according to the running condition of the vehicle is derived in short time such as the sampling interval of the GPS orientation, so that drifts in the offset value can be tracked with high precision.

The temporary angular velocity conversion coefficient is derived and, by performing the filter process on the temporary angular velocity conversion coefficient using the forgetting factor according to the operation period of the angular velocity sensor, the angular velocity conversion coefficient is derived. Consequently, even in short time after startup, an error included in the angular velocity conversion coefficient can be reduced. Since an error included in the angular velocity conversion coefficient is reduced, the precision of deriving the angular velocity conversion coefficient can be improved. Since two states are substantially specified as running conditions and two kinds of methods of deriving temporary offset values and the forgetting factors α1 and α2 are prepared, the process can be simplified. The angular velocity conversion coefficient of the angular velocity sensor is also calculated in consideration of the inclination angle of the vehicle and its fluctuations, so that the derivation precision can be improved also in the running condition of an inclined road. Since drifts in the offset value can be addressed with high precision, the angular velocity conversion coefficient can be derived accurately immediately after startup of the navigation apparatus. Since the precision of deriving the offset value and the angular velocity conversion coefficient is improved, the angular velocity deriving precision can be improved.

Second Embodiment

A second embodiment relates to the angular velocity calculating apparatus 100 like the first embodiment. In the first embodiment, the running conditions are classified into the stop state, the straight running condition, and the non-straight-running condition. The by-state offset value deriving unit 42 and the offset value filter process unit 44 execute similar processes on the stop state and the straight running condition. In the first embodiment, therefore, it can be said different processes are substantially performed on the two states. On the other hand, the angular velocity calculating apparatus 100 as the second embodiment sets different values as the forgetting factor for the stop state and the forgetting factor for the straight running condition. Consequently, it can be said that different processes are performed in the three states in the second embodiment. The angular velocity calculating apparatus 100, the offset value computing unit 28, the offset value filter process unit 44, and the angular velocity conversion coefficient computing unit 30 of the second embodiment are of types similar to those of FIGS. 1, 2, 3, and 5, respectively. Therefore, the differences will be mainly described.

Figure 9:
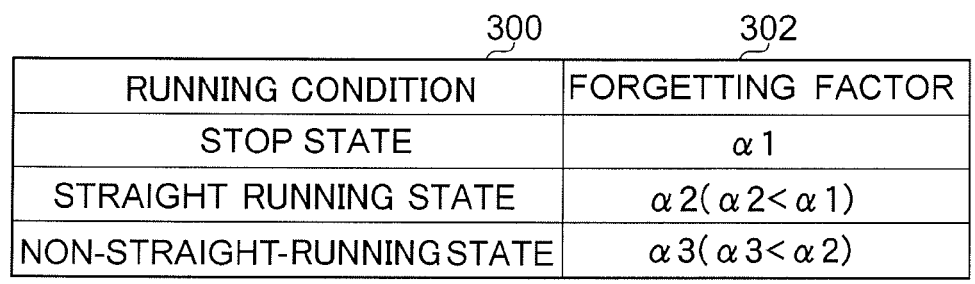
FIG. 9 is a diagram showing data structure of a table stored in a forgetting factor setting unit in a second embodiment of the present invention.

FIG. 9 is a diagram showing the data structure of a table stored in the forgetting factor setting unit 76 in the second embodiment of the invention. The table of FIG. 9 is shown in a manner similar to FIG. 4. In the forgetting factor column 302, the forgetting factor "α1" corresponding to the stop state, the forgetting factor "α2" corresponding to the straight running condition, and the forgetting factor "α3" corresponding to the non-straight running condition are shown. The relation of α1>α2>α3 is specified. The influence of the past temporary offset value 210 decreases in order of the stop state, the straight running condition, and the non-straight running condition. As described above, the forgetting factor setting unit 76 selects the forgetting factor on the basis of the running condition information 212 with reference to the table. The forgetting factor setting unit 76 sets the selected forgetting factor in the αi multiplier 70 and the 1−αi multiplier 74.

In the second embodiment of the present invention, three forgetting factors are prepared for three states as the running conditions. Consequently, the filter process adapted to the three states can be realized. Since the filter process adapted to each of the states is realized, the process precision can be improved.

Third Embodiment

A third embodiment relates to the angular velocity calculating apparatus 100 like the foregoing embodiments and, particularly, to the angular velocity conversion coefficient computing unit 30. Conventionally, according to the operation time of the angular velocity sensor 26, the forgetting factor in the angular velocity conversion coefficient filter unit 82 is changed. On the other hand, as described above, due to deterioration in the precision of the GPS orientation depending on the reception state of radio waves from a GPS satellite, an error included in the angular velocity conversion coefficient increases. In such a case as well, to suppress deterioration in the precision of the angular velocity conversion coefficient, the angular velocity conversion coefficient computing unit 30 of the third embodiment estimates reliability of a temporary angular velocity conversion coefficient, and sets a forgetting factor in the angular velocity conversion coefficient filter unit 82 according to the reliability. The angular velocity calculating apparatus 100 of the third embodiment is of a type similar to that of the angular velocity calculating apparatus 100 shown in FIG. 1. Since the offset value computing unit 28 has been described above, the angular velocity conversion coefficient computing unit 30 will be mainly described.

Figure 10:
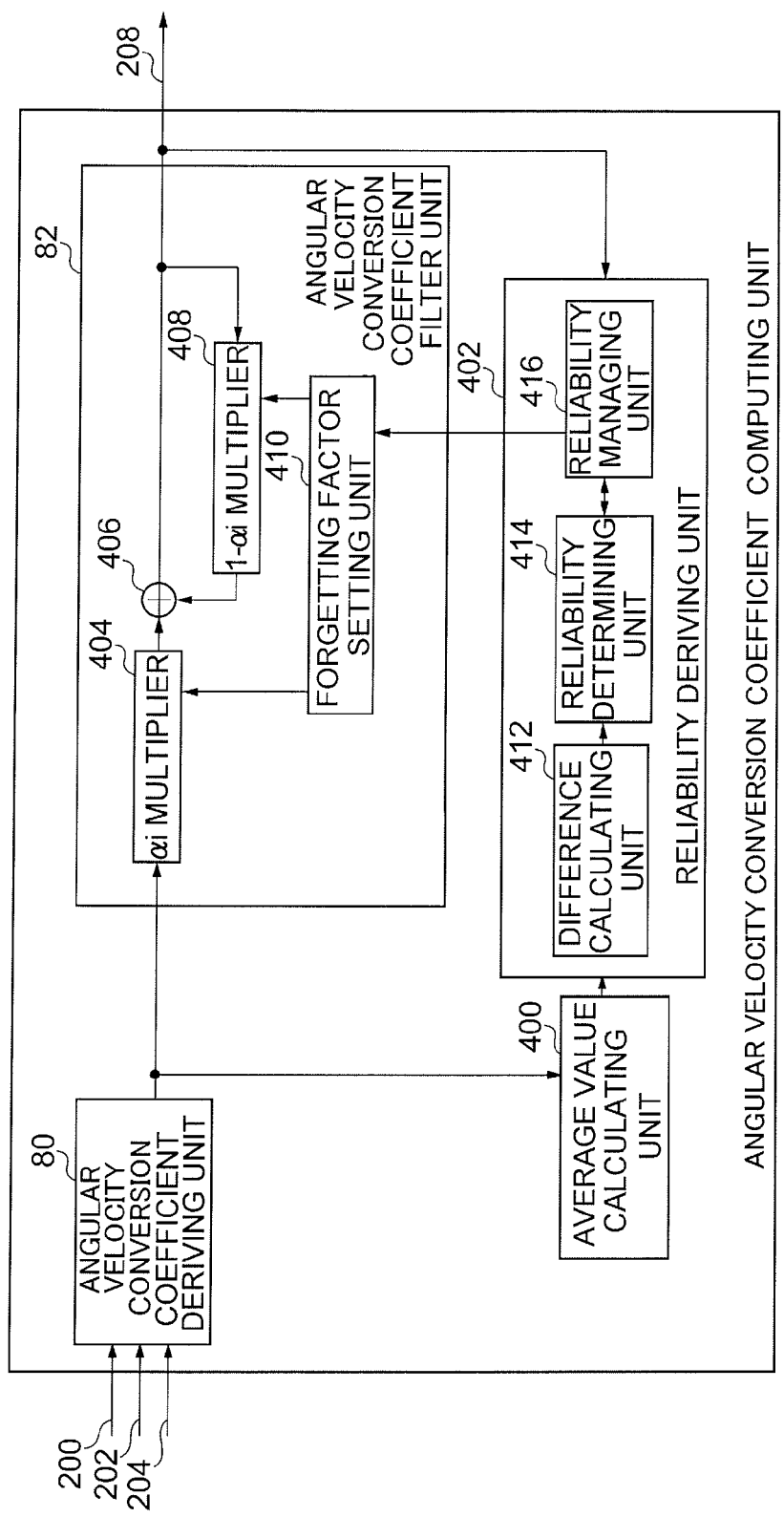
FIG. 10 is a diagram showing the configuration of an angular velocity conversion coefficient computing unit in a third embodiment of the present invention.

FIG. 10 shows the configuration of the angular velocity conversion coefficient computing unit 30 of the third embodiment of the invention. The angular velocity conversion coefficient computing unit 30 includes the angular velocity conversion coefficient deriving unit 80, the angular velocity conversion coefficient filter unit 82, an average value calculating unit 400, and a reliability deriving unit 402. The angular velocity conversion coefficient filter unit 82 includes an αi multiplier 404, an adder 406, a 1−αi multiplier 408, and a forgetting factor setting unit 410. The reliability deriving unit 402 includes a difference calculating unit 412, a reliability determining unit 414, and a reliability managing unit 416.

Like the description of FIG. 5, the angular velocity conversion coefficient deriving unit 80 sequentially derives a temporary angular velocity conversion coefficient of the angular velocity sensor 26 on the basis of the GPS measurement data 200, the output signal 202, the inclination angle 204, and the offset value 206. The angular velocity conversion coefficient deriving unit 80 outputs the temporary derived temporary angular velocity conversion coefficient to the angular velocity conversion coefficient filter unit 82, and the average value calculating unit 400. The average value calculating unit 400 receives the temporary angular velocity conversion coefficient of the angular velocity sensor 26 sequentially derived from the angular velocity conversion coefficient deriving unit 80. The average value calculating unit 400 holds temporary angular velocity conversion coefficients sequentially output from the angular velocity conversion coefficient deriving unit 80 for a predetermined period, thereby sequentially deriving average values of the temporary angular velocity conversion coefficients (hereinbelow, called "average values"). To derive an average value, for example, moving average is executed. The predetermined period is specified as a period in which Δθ in the equation (6) is continuously equal to or larger than a predetermined value. The average value calculating unit 400 sequentially outputs the average value to the difference calculating unit 412.

The difference calculating unit 412 sequentially receives the average value from the average value calculating unit 400, and also receives the angular velocity conversion coefficient 208 from the angular velocity conversion coefficient filter unit 82. The configuration of the angular velocity conversion coefficient filter unit 82 will be described later. Since the angular velocity conversion coefficient 208 is fed back from the angular velocity conversion coefficient filter unit 82 to the difference calculating unit 412, it can be said as the angular velocity conversion coefficient 208 derived in the past by the angular velocity conversion coefficient filter unit 82. In the following, the angular velocity conversion coefficient 208 derived in the past in the angular velocity conversion coefficient filter unit 82 is also called as "angular velocity conversion coefficient 208." The difference calculating unit 412 derives the absolute value of the difference (hereinbelow, called "difference value") between the angular velocity conversion coefficient 208 and the average value. To derive the difference value, for example, subtraction is executed. The difference calculating unit 412 outputs the difference value to the reliability determining unit 414.

Figure 11:
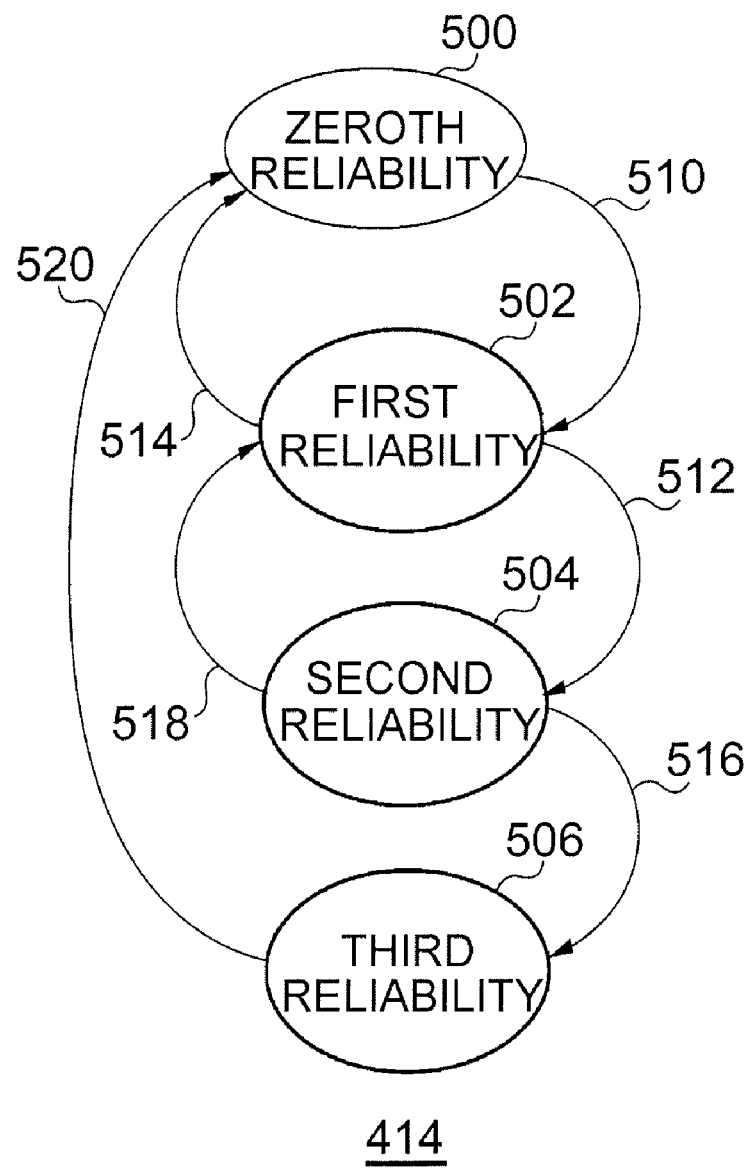
FIG. 11 is a diagram showing outline of operation in a reliability determining unit in FIG. 10.

The reliability determining unit 414 sequentially receives the difference value from the difference calculating unit 412. The reliability determining unit 414 determines the reliability of the angular velocity conversion coefficient 208 on the basis of the difference value. The reliability is expressed by values which are set step by step or continuous values. As an example, it is assumed here that the reliability is set in four steps. With reference to FIG. 11, the process of the reliability determining unit 414 in this case will be described. FIG. 11 shows outline of the operation in the reliability determining unit 414. As four reliabilities, zeroth reliability 500, first reliability 502, second reliability 504, and third reliability 506 are specified. The third reliability 506 is the highest, and the zeroth reliability 500 is the lowest.

Increase in the reliability corresponds to decrease in the difference value. Further, decrease in the difference value corresponds to decrease in fluctuations in the temporary angular velocity conversion coefficient. That is, the zeroth reliability 500 corresponds to a state where correction of the angular velocity conversion coefficient is insufficient. The third reliability 506 corresponds to a state where correction of the angular velocity conversion coefficient is sufficient. The reliability determining unit 414 obtains the present reliability from the reliability managing unit 416 and, when the difference value satisfies a predetermined condition, determines shift to another reliability. For example, in the initial state, the reliability determining unit 414 obtains information that the present reliability is the zeroth reliability 500 from the reliability managing unit 416.

When the difference value satisfies a first condition 510, the reliability determining unit 414 determines shift from the zeroth reliability 500 to the first reliability 502. When the difference value satisfies a second condition 512, the reliability determining unit 414 determines shift from the first reliability 502 to the second reliability 504. When the difference value satisfies a third condition 514, the reliability determining unit 414 determines shift from the first reliability 502 to the zeroth reliability 500. When the difference value satisfies a fourth condition 516, the reliability determining unit 414 determines shift from the second reliability 504 to the third reliability 506. When the difference value satisfies a fifth condition 518, the reliability determining unit 414 determines shift from the second reliability 504 to the first reliability 502. The third reliability 506 corresponds to the state where the angular velocity conversion coefficient is sufficiently corrected as described above. Consequently, when the difference value satisfies a sixth condition 520, the reliability determining unit 414 determines deterioration due to a change in the mounting angle to the vehicle or the like, and determines shift from the third reliability 506 to the zeroth reliability 500. When shift of the reliability is determined, the reliability determining unit 414 notifies the reliability managing unit 416 of the determination, and the reliability managing unit 416 manages the new reliability.

The condition used for determining shift of reliability will be described. FIG. 12 shows the data structure of a table stored in the reliability determining unit 414. As shown in the diagram, a present reliability column 330, a condition column 332, and a column 334 of reliability after shift are included. The present reliability is shown in the present reliability column 330. A condition for shifting the reliability is shown in the condition column 332. A reliability to which the present reliability shifts is shown in the column 334 of reliability after the shift.

Specifically, conditions shown in the condition column 332 are, in order from top, the first condition 510, the second condition 512, the third condition 514, the fourth condition 516, the fifth condition 518, and the sixth condition 520. For example, in the case of the zeroth reliability 500, when the state in which the difference value becomes a threshold value 1 or less continues ten times, the reliability determining unit 414 determines shift to the first reliability 502. Relations such as threshold 1 threshold 2 threshold 3 are specified. As the reliability becomes higher, the transition condition becomes stricter.

Under the condition to increase reliability, "ten times in a row" is specified. Under the condition to decrease reliability, "three times in a row" is specified. That is, the number of consecutive times under the condition to increase reliability is larger than that under the condition to decrease reliability. It corresponds to the fact that decrease in reliability is performed more easily than increase in reliability. By strictly evaluating the reliability as described above, the influence of an error is reduced. Referring again to FIG. 10, the above process will be summarized. As the difference value decreases, the reliability determining unit 414 specifies higher reliability step by step in a plurality of reliabilities which are set step by step. The reliability determining unit 414 outputs the reliability to the forgetting factor setting unit 410. The reliability managing unit 416 manages the present reliability as described above and, as necessary, outputs the reliability to the reliability determining unit 414.

The forgetting factor setting unit 410 receives the reliability from the reliability determining unit 414 and determines a forgetting factor to be set in the $\alpha i$ multiplier 404 and the $1-\alpha i$ multiplier 408 on the basis of the reliability. To be specific, the forgetting factor setting unit 410 changes a forgetting factor used for the statistical process in the angular velocity conversion coefficient filter unit 82 in accordance with the difference value. FIG. 13 shows the data structure of a table stored in the forgetting factor setting unit 410. As shown in the diagram, a reliability column 340 and a forgetting factor column 342 are included, and a forgetting factor corresponding to reliability is specified. The forgetting factor setting unit 410 specifies a forgetting factor corresponding to the received reliability with reference to the table.

In the table, the higher the reliability is, the larger the forgetting factor is. It corresponds to the fact that the higher the reliability is, the smaller the influence of a temporary angular velocity conversion coefficient obtained in the past, for example, the influence of the angular velocity conversion coefficient 208 derived already becomes. Specifically, it is determined that as the reliability increases, the temporary angular velocity conversion coefficient newly derived by the angular velocity conversion coefficient deriving unit 80 is more reliable than the angular velocity conversion coefficient 208 derived in the past by the angular velocity conversion coefficient filter unit 82, and a forgetting factor by which a weight of the former coefficient becomes larger is set. In the case where reliability is low, the opposite description is valid. Referring again to FIG. 10, the forgetting factor setting unit 410 outputs the determined forgetting factor to the $\alpha i$ multiplier 404 and the $1-\alpha i$ multiplier 408.

Since the $\alpha i$ multiplier 404, the adder 406, and the $1-\alpha i$ multiplier 408 are similar to the $\alpha i$ multiplier 70, the adder 72, and the $1-\alpha i$ multiplier 74 in FIG. 3, respectively, they will not be described here. As a result, the angular velocity conversion coefficient filter unit 82 derives the angular velocity conversion coefficient 208 and outputs the angular velocity conversion coefficient 208 to the difference calculating unit 412, and the angular velocity converting unit 14 and the offset value computing unit 28 in FIG. 1. As described above, the not-shown angular velocity converting unit 14 calculates final angular velocity $\omega$ of the vehicle on the basis of the output signal 202 from the angular velocity sensor 26, the offset value 206 from the offset value computing unit 28, and the angular velocity conversion coefficient 208 from the angular velocity conversion coefficient computing unit 30. It corresponds to correction of the output signal 202 by using the output signal 202 and the angular velocity conversion coefficient 208.

Figure 14:
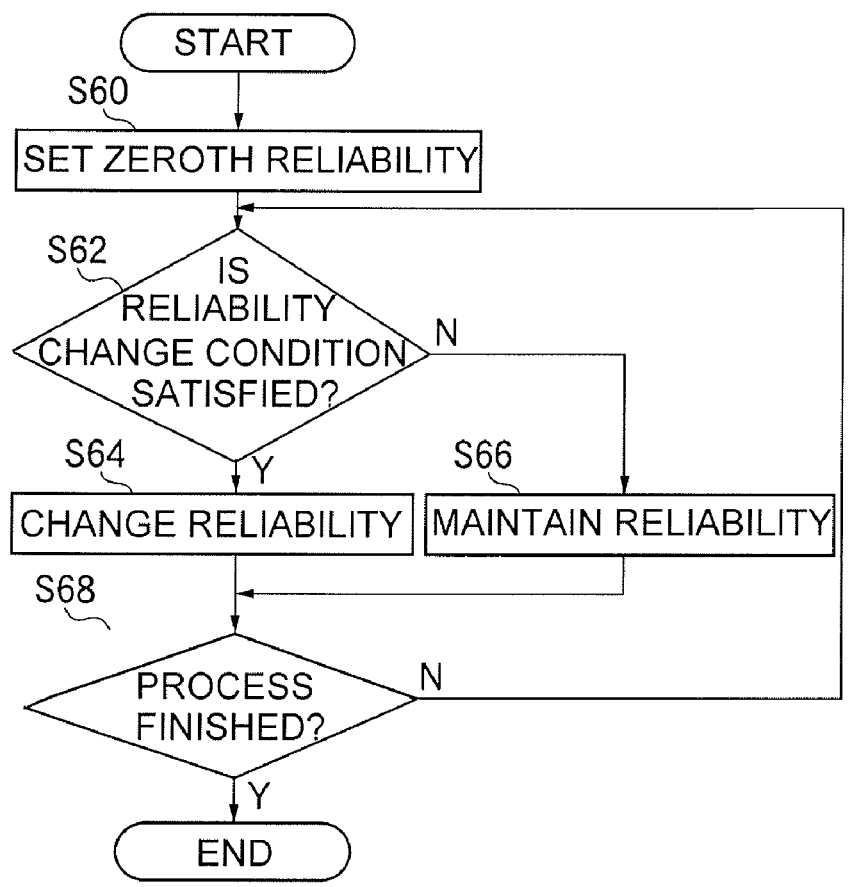
FIG. 14 is a flowchart showing procedure of deriving reliability by a reliability deriving unit in FIG. 10.

The operation of the angular velocity conversion coefficient computing unit 30 having the above configuration will be described. FIG. 14 is a flowchart showing procedure of deriving reliability by the reliability deriving unit 402. The reliability determining unit 414 sets zeroth reliability 500 as reliability (S60). When the difference value satisfies a reliability change condition (Y in S62), the reliability determining unit 414 changes reliability (S64). When the difference value does not satisfy the reliability change condition (N in S62), the reliability determining unit 414 maintains reliability (S66). When the process is not finished (N in S68), the reliability determining unit 414 returns to step 62. On the other hand, the process is finished (Y in S68), the operation is finished.

In the embodiment of the present invention, the reliability is specified on the basis of the difference value between the angular velocity conversion coefficient derived in the past and the average value of the temporary angular velocity conversion coefficients, so that reliability corresponding to the temporary angular velocity conversion coefficient can be specified. Since the forgetting factor in the statistical process is changed according to the reliability, the forgetting factor adapted to the present temporary angular velocity conversion coefficient can be set. By executing the statistical process on the temporary angular velocity conversion coefficient using the forgetting factor, the angular velocity conversion coefficient is derived. Consequently, even in short time after startup, the precision of deriving the angular velocity conversion coefficient can be improved. Since the precision of deriving the angular velocity conversion coefficient is improved even in short time after startup, the precision of deriving angular velocity can be improved.

As the reliability increases, the influence of a new temporary angular velocity conversion coefficient increases. Consequently, deterioration in precision of the statistical process can be suppressed. As the reliability becomes higher, the influence of a new temporary angular velocity conversion coefficient increases, so that the new temporary angular velocity conversion coefficient can be reflected in the angular velocity conversion coefficient. The offset value is derived by performing the statistical process on the temporary offset value using the forgetting factor according to the running condition, and the angular velocity conversion coefficient is derived by performing the statistical process on the temporary angular velocity conversion coefficient using the forgetting factor according to the reliability. Therefore, the precision of deriving the angular velocity can be improved even in short time after startup.

Fourth Embodiment

A fourth embodiment relates to the angular velocity calculating apparatus 100 like the foregoing embodiments and, particularly, to the angular velocity conversion coefficient computing unit 30. In the third embodiment, the reliability deriving unit 402 derives reliability on the basis of the average value of the temporary angular velocity conversion coefficients and the angular velocity conversion coefficient 208. An object of the fourth embodiment is to improve precision of deriving the reliability. The reliability deriving unit 402 in the fourth embodiment derives a distributed value of the temporary angular velocity conversion coefficient in addition to the average value and the angular velocity conversion coefficient 208, and uses the distributed value as well at the time of determining the reliability. As a result, if the distributed value is large although the difference value between the average value and the angular velocity conversion coefficient 208 is small, it is estimated that fluctuations in the temporary angular velocity conversion coefficient are large, and the reliability in this case is decreased. The angular velocity calculating apparatus 100 of the fourth embodiment is also of a type similar to that of the angular velocity calculating apparatus 100 shown in FIG. 1. Since the offset value computing unit 28 has been described above, the angular velocity conversion coefficient computing unit 30 will be mainly described.

Figure 15:
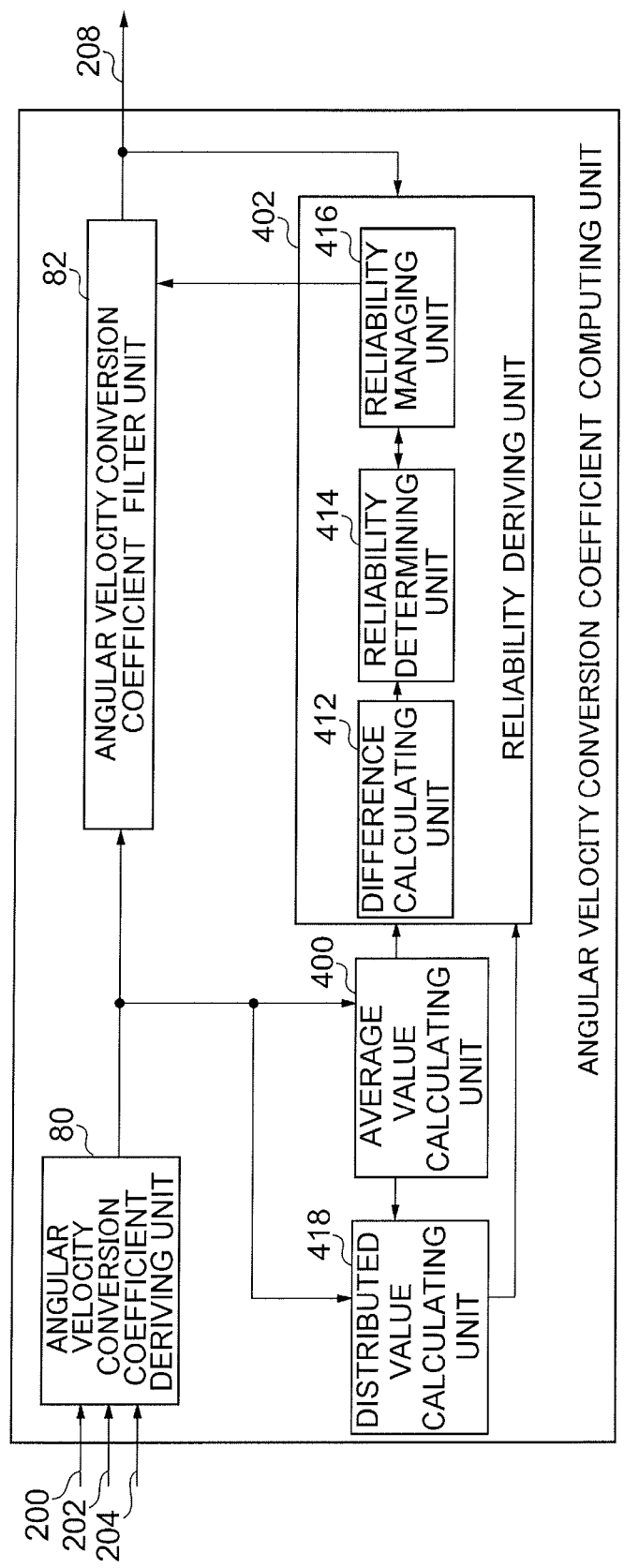
FIG. 15 is a diagram showing the configuration of an angular velocity conversion coefficient computing unit in a fourth embodiment of the present invention.

FIG. 15 shows the configuration of the angular velocity conversion coefficient computing unit 30 of the fourth embodiment of the invention. The angular velocity conversion coefficient computing unit 30 includes, in addition to the components of the angular velocity conversion coefficient computing unit 30 shown in FIG. 10, a distributed value calculating unit 418. The distributed value calculating unit 418 sequentially receives the temporary angular velocity conversion coefficient. The distributed value calculating unit 418 derives a distributed value of a temporary angular velocity conversion coefficient with respect to the average value. Since it is sufficient to use a known technique for deriving a distributed value, derivation will not be described here. The distributed value calculating unit 418 outputs a distributed value to the reliability determining unit 414.

The reliability determining unit 414 determines reliability in consideration of the distributed value from the distributed value calculating unit 418 in addition to the difference value from the difference calculating unit 412. The reliability is specified in a manner similar to the third embodiment. A condition used for determining shift of reliability will be described also here. FIG. 16 shows data structure of a table stored in the reliability determining unit 414. In FIG. 16, like in FIG. 12, a present reliability column 330, a condition column 332, and a column 334 of reliability after shift are included. For simpler explanation, conditions for increasing reliability, that is, only a first condition 510, a second condition 512, and a fourth condition 516 are shown. In the case where the present reliability is the zeroth reliability 500, when a state where the difference value becomes equal to or less than the threshold value 1 continues ten times, that is, when the first condition 510 is satisfied, the reliability determining unit 414 determines shift to the first reliability 502.

A condition that the distributed value is equal to or less than a threshold value 4 is added to each of the conditions. As a result, in the case where the present reliability is the zeroth reliability 500, when the state where the difference value becomes equal to or less than the threshold 1 and the distributed value is equal to or less than the threshold 4 continues ten times, the reliability determining unit 414 determines shift to the first reliability 502. Consequently, even when the difference value becomes equal to or less than the threshold 1, if the distributed value is larger than the threshold 4, shift to the first reliability 502 does not occur. That is, the reliability is not improved. It corresponds to the case where even when the difference value is the same, the reliability determining unit 414 specifies higher reliability step by step as the distributed value decreases. FIG. 15 will be referred to again.

The conditions to increase reliability have been described. For the conditions to decrease reliability, that is, the third condition 514, the fifth condition 518, and the sixth condition 520, a difference value may not be considered. That is, in the case where the difference value satisfies a condition, it is sufficient for the reliability determining unit 414 to determine shift to lower reliability.

In the embodiment of the present invention, the reliability is determined in consideration of not only the difference value but also the distributed value, so that the influence of variations in the temporary angular velocity conversion coefficient can be reflected in reliability. If the distributed value is large, even when the difference value is small, the reliability is not increased. Consequently, the influence of an error included in the temporary angular velocity conversion coefficient can be reduced. Since reliability is determined on the basis of the difference value and the distributed value, the reliability can be controlled finely. Since it is sufficient to derive the distributed value in addition to the average value, increase in the process amount can be suppressed.

Fifth Embodiment

A fifth embodiment relates to the angular velocity calculating apparatus 100 like the foregoing embodiments. In the first embodiment, a forgetting factor for the offset value filter process unit 44 is set in accordance with the running condition such as the stop state. An object of the fifth embodiment is to control a forgetting factor more finely. In the fifth embodiment, at the time of determining a forgetting factor for a non-straight-running condition, reliability is reflected. The reliability is derived in a manner similar to the third or fourth embodiment. Forgetting factors for the non-straight-running condition are specified according to a plurality of reliabilities. One forgetting factor is determined according to the present reliability. As a result, a forgetting factor is determined while making the reliability reflected in addition to the running condition, so that the forgetting factor is controlled finely. The angular velocity calculating apparatus 100 of the fourth embodiment is also of a type similar to that of the angular velocity calculating apparatus 100 shown in FIG. 1. The differences will be mainly described.

The reliability deriving unit 402 determines reliability in a manner similar to FIGS. 10 and 15. The reliability deriving unit 402 determines reliability to the forgetting factor setting unit 76 in FIG. 3. The forgetting factor setting unit 76 receives the running condition information 212 in a manner similar to the foregoing embodiments. The forgetting factor setting unit 76 also receives reliability from the reliability deriving unit 402. The forgetting factor setting unit 76 determines the value of a forgetting factor "αi" in accordance with the state shown by the running condition information 212 and reliability. Further, the forgetting factor setting unit 76 sets he determined forgetting factor "αi" into the αi multiplier 70 and the 1−αi multiplier 74. FIG. 17 shows data structure of a table stored in the forgetting factor setting unit 76 of the fifth embodiment of the present invention. As shown in the diagram, like in FIGS. 4 and 9, the running condition column 300 and the forgetting factor column 302 are included and, in addition, the reliability column 320 is included.

In the case where the state shown by the running condition information 212 is the stop state and the straight running condition, the forgetting factor setting unit 76 selects the forgetting factors "α1" and "αα2", respectively, with reference to the table shown in FIG. 17. On the other hand, in the case where the state shown by the running condition information 212 is the non-straight running condition, the forgetting factor setting unit 76 selects a forgetting factor on the basis of the reliability with reference to the table shown in FIG. 17. Concretely, the forgetting factor setting unit 76 selects forgetting factors "α31", "α32", "α33", and "α34" in correspondence with the third reliability 506, the second reliability 504, the first reliability 502, and the zeroth reliability 500, respectively.

In the embodiment of the present invention, not only the running condition but also reliability are reflected, so that the forgetting factor can be controlled finely. Since the reliability is reflected in the non-straight running condition, the precision of deriving the forgetting factor in the non-straight running condition can be improved. Since the reliability is not reflected in the stop state and the straight running condition, increase in the process amount can be suppressed.

The present invention has been described above on the basis of the embodiments. It can be understood by a person skilled in the art that the embodiments are illustrative, combinations of the components and the processes can be variously modified, and such modifications are also in the scope of the present invention.

In the embodiments of the invention, the offset value computing unit 28 and the angular velocity conversion coefficient computing unit 30 use Δθ on the basis of the GPS orientation included in the GPS measurement data 200 at the time of calculating the equations (4) and (6). However, the invention is not limited to the embodiments. For example, the offset value computing unit 28 and the angular velocity conversion coefficient computing unit 30 may use a road orientation to which the vehicle matches using a not-shown map database. For the matching of the vehicle to the map database, the GPS measurement data 200 is used. In the modification, the degree of freedom of the configuration of the angular velocity calculating apparatus 100 can be improved.

In the embodiments of the invention, the inclination detecting unit 24 calculates the inclination angle 204 of the vehicle using the GPS altitude. However, the invention is not limited to the embodiments. For example, the inclination detecting unit 24 may have an acceleration sensor and calculates the inclination angle 204 by using the information from the acceleration sensor. In the case where altitude information exits in road information included in the not-shown map database, the inclination detecting unit 24 may use altitude information of a road to which the vehicle matches. In the modification, the inclination angle 204 can be derived with high precision.

In the embodiments of the invention, the offset value computing unit 28 and the angular velocity conversion coefficient computing unit 30 use the inclination angle 204 at the time of deriving the temporary offset value 210 and the temporary angular velocity conversion coefficient. However, the invention is not limited to the embodiments. For example, the inclination angle 204 may not be used. In this case, a in the equations (4) and (6) is set to 0. In the modification, the process can be facilitated.

In the embodiments of the invention, the state estimating unit 40 determines the stop state by using the GPS speed included in the GPS measurement data 200 as determination of the running condition of the vehicle. However, the invention is not limited to the embodiments. For example, the state estimating unit 40 receives a vehicle speed pulse signal of the vehicle from a not-shown pulse detector and determines the stop state on the basis of the vehicle speed pulse. The pulse detector is connected to a not-shown speed sensor. The speed sensor is mounted in some midpoint in a speed meter cable which rotates in correspondence with rotation of a driveshaft, and outputs a vehicle speed pulse signal accompanying the rotation of the driveshaft. In the modification, the speed of the vehicle can be measured by various means.

In the embodiments of the present invention, the validity determining unit 22 uses a PDOP to determine validity of the GPS measurement data 200. However, the invention is not limited to the embodiments. For example, the validity determining unit 22 may use a Geometric Dilution Of Precision (GDOP), a Horizontal Dilution Of Precision (HDOP), and the like or a combination of them. In the modification, various parameters can be used for determination.

In the embodiments of the invention, each of the offset value filter process unit 44 and the angular velocity conversion coefficient filter unit 82 is formed to include an IIR filter. However, the invention is not limited to the embodiments. For example, each of the offset value filter process unit 44 and the angular velocity conversion coefficient filter unit 82 may be formed so as to include a Finite Impulse Response (FIR) filter. In this case, the forgetting factor is set as a tap coefficient. In the modification, the degree of freedom of the filter configuration can be improved.

What is claimed is:

1. An angular velocity sensor correcting apparatus comprising:

an obtaining unit for obtaining measurement data of an object measured on the basis of a signal from a GPS satellite and angular velocity of the object output from an angular velocity sensor;

an angular velocity conversion coefficient deriving unit for sequentially deriving a temporary angular velocity conversion coefficient of the angular velocity sensor on the basis of the measurement data and the angular velocity obtained by the obtaining unit; and an angular velocity conversion coefficient filter process unit for deriving an angular velocity conversion coefficient of the angular velocity sensor for correcting the angular velocity output from the angular velocity sensor by executing a statistical process on the temporary angular velocity conversion coefficient of the angular velocity sensor sequentially derived by the angular velocity conversion coefficient deriving unit, wherein the angular velocity conversion coefficient filter process unit changes a forgetting factor in the statistical process in accordance with a difference between an angular velocity conversion coefficient of the angular velocity sensor derived in the past in the angular velocity conversion coefficient filter process unit and an average value of temporary sensitive coefficients of the angular velocity sensor sequentially derived by the angular velocity conversion coefficient deriving unit.

2. The angular velocity sensor correcting apparatus of claim 1, wherein the angular velocity conversion coefficient filter process unit comprises:

a reliability deriving unit for specifying a higher reliability step by step from reliabilities specified in a plurality of steps as the difference between the angular velocity conversion coefficient of the angular velocity sensor derived in the past in the angular velocity conversion coefficient filter process unit and an average value of temporary angular velocity conversion coefficients of the angular velocity sensor sequentially derived by the angular velocity conversion coefficient deriving unit decreases; and a forgetting factor setting unit for using a forgetting factor at the time of the statistical process by which the influence of a temporary angular velocity conversion coefficient obtained in the past in derivation of the angular velocity conversion coefficient of the angular velocity sensor decreases as the specified reliability increases.

3. The angular velocity sensor correcting apparatus of claim 2, wherein the reliability deriving unit in the angular velocity conversion coefficient filter process unit specifies a higher reliability step by step as a distributed value of a temporary angular velocity conversion coefficient of the angular velocity sensor sequentially derived by the angular velocity conversion coefficient deriving unit becomes smaller even when the difference between the angular velocity conversion coefficient of the angular velocity sensor derived in the past in the angular velocity conversion coefficient filter process unit and the average value of the temporary angular velocity conversion coefficients of the angular velocity sensor sequentially derived by the angular velocity conversion coefficient deriving unit are the same.

4. An angular velocity calculating apparatus comprising:

an obtaining unit for obtaining measurement data of an object measured on the basis of a signal from a GPS satellite and angular velocity of the object output from an angular velocity sensor;

an estimating unit for estimating a running condition of the object on the basis of the measurement data and the angular velocity obtained in the obtaining unit;

an offset value deriving unit for sequentially deriving a temporary offset value of the angular velocity sensor while changing combination of the measurement data and the angular velocity obtained by the obtaining unit in accordance with the running condition of the object estimated by the estimating unit;

an offset value filter process unit for deriving an offset value of the angular velocity sensor for correcting the angular velocity output from the angular velocity sensor by executing a statistical process on the temporary offset value of the angular velocity sensor sequentially derived by the offset value deriving unit;

an angular velocity conversion coefficient deriving unit for sequentially deriving a temporary angular velocity conversion coefficient of the angular velocity sensor on the basis of the measurement data and the angular velocity obtained by the obtaining unit;

an angular velocity conversion coefficient filter process unit for deriving an angular velocity conversion coefficient of the angular velocity sensor for correcting the angular velocity output from the angular velocity sensor by executing a statistical process on the temporary angular velocity conversion coefficient of the angular velocity sensor sequentially derived by the angular velocity conversion coefficient deriving unit; and an angular velocity converting unit for correcting the angular velocity of the object obtained by the obtaining unit using the angular velocity conversion coefficient of the angular velocity sensor derived by the angular velocity conversion coefficient filter process unit and the offset value of the angular velocity sensor derived by the offset value filter process unit, wherein the offset value filter process unit changes a forgetting factor in the statistical process in accordance with the running condition of the object estimated by the estimating unit, and the angular velocity conversion coefficient filter process unit changes a forgetting factor in the statistical process in accordance with a difference between an angular velocity conversion coefficient of the angular velocity sensor derived in the past in the angular velocity conversion coefficient filter process unit and an average value of temporary sensitive coefficients of the angular velocity sensor sequentially derived by the angular velocity conversion coefficient deriving unit.

5. An angular velocity sensor correcting method executed in an angular velocity sensor correcting apparatus, the method comprising:

obtaining, by the angular velocity sensor correcting apparatus, measurement data of an object measured on the basis of a signal from a GPS satellite and angular velocity of the object output from an angular velocity sensor;

sequentially deriving, by the angular velocity sensor correcting apparatus, temporary angular velocity conversion coefficients of the angular velocity sensor on the basis of the measurement data and the obtained angular velocity; and deriving, by the angular velocity sensor correcting apparatus, an angular velocity conversion coefficient of the angular velocity sensor for correcting the angular velocity output from the angular velocity sensor by executing statistical process on the temporary angular velocity conversion coefficient of the angular velocity sensor sequentially derived, wherein a forgetting factor in the statistical process is changed in accordance with a difference between an angular velocity conversion coefficient of the angular velocity sensor derived in the past and a sequentially derived average value of temporary sensitive coefficients of the angular velocity sensor.

6. An angular velocity calculating method executed in an angular velocity calculating apparatus, the method comprising:

obtaining, by the angular velocity calculating apparatus, measurement data of an object measured on the basis of a signal from a GPS satellite and angular velocity of the object output from an angular velocity sensor;

estimating, by the angular velocity calculating apparatus, a running condition of the object on the basis of the measurement data and the obtained angular velocity;

sequentially deriving, by the angular velocity calculating apparatus, a temporary offset value of the angular velocity sensor while changing combination of the measurement data and the angular velocity obtained in accordance with the running condition of the object estimated;

deriving, by the angular velocity calculating apparatus, an offset value of the angular velocity sensor for correcting the angular velocity output from the angular velocity sensor by executing a statistical process on the sequentially derived temporary offset value of the angular velocity sensor;

sequentially deriving, by the angular velocity calculating apparatus, a temporary angular velocity conversion coefficient of the angular velocity sensor on the basis of the measurement data and the obtained angular velocity;

deriving, by the angular velocity calculating apparatus, an angular velocity conversion coefficient of the angular velocity sensor for correcting the angular velocity output from the angular velocity sensor by executing statistical process on the sequentially derived temporary angular velocity conversion coefficient of the angular velocity sensor; and correcting, by the angular velocity calculating apparatus, the angular velocity of the obtained object using the angular velocity conversion coefficient of the angular velocity sensor derived and the derived offset value of the angular velocity sensor, wherein a forgetting factor in the statistical process is changed in accordance with the running condition of the object estimated when deriving the offset value of the angular velocity sensor, and a forgetting factor in the statistical process is changed in accordance with a difference between an angular velocity conversion coefficient of the angular velocity sensor derived in the past and an average value of sequentially derived temporary sensitive coefficients of the angular velocity sensor when deriving the angular velocity conversion coefficient of the angular velocity sensor.

* * * * *